United States Patent [19]
Hobbs

[11] 3,968,626
[45] July 13, 1976

[54] APPARATUS FOR BAGGING MATERIAL
[76] Inventor: Oliver K. Hobbs, Box 1306, Suffolk, Va. 23434
[22] Filed: Nov. 11, 1974
[21] Appl. No.: 522,761

[52] U.S. Cl. ................................. 53/267; 222/70;
222/415; 198/24; 200/31 R; 200/47;
141/166; 141/312; 141/316
[51] Int. Cl.² ........................................... B65B 1/00
[58] Field of Search .............................. 222/14–20,
222/22, 63, 55, 52, 70, 415; 198/24; 200/31
R, 31 A, 153 T, 47; 141/166, 171, 176, 177,
312, 316; 53/267

[56] References Cited
UNITED STATES PATENTS

| | | | |
|---|---|---|---|
| 289,039 | 11/1883 | Smith | 198/196 |
| 1,851,910 | 3/1932 | Johns | 222/415 X |
| 1,894,008 | 1/1933 | Segars | 222/415 X |
| 2,111,663 | 3/1938 | Graemiger | 222/415 X |
| 2,156,224 | 4/1939 | Neumann et al. | 141/312 |
| 3,109,560 | 11/1963 | Rosenleaf | 222/63 |
| 3,126,086 | 3/1964 | Holben | 198/24 |
| 3,429,458 | 2/1969 | McWilliams | 198/24 X |

*Primary Examiner*—Allen N. Knowles
*Attorney, Agent, or Firm*—Clelle W. Upchurch

[57] ABSTRACT

An apparatus for bagging a comminuted material such as broken or shredded tree bark, shredded insulating materials, plastic pellets, granular fertilizer material, grain or the like has a hopper provided with a discharge chute and bag holder adapted to sense the presence of a bag associated therewith, means for discharging a measured volume of bark into the bag responsive to the bag holder, means for conveying the bag after it is charged with bark through means for sealing the bag, and conveyor means for carrying the sealed bag to storage or transporting means.

24 Claims, 23 Drawing Figures

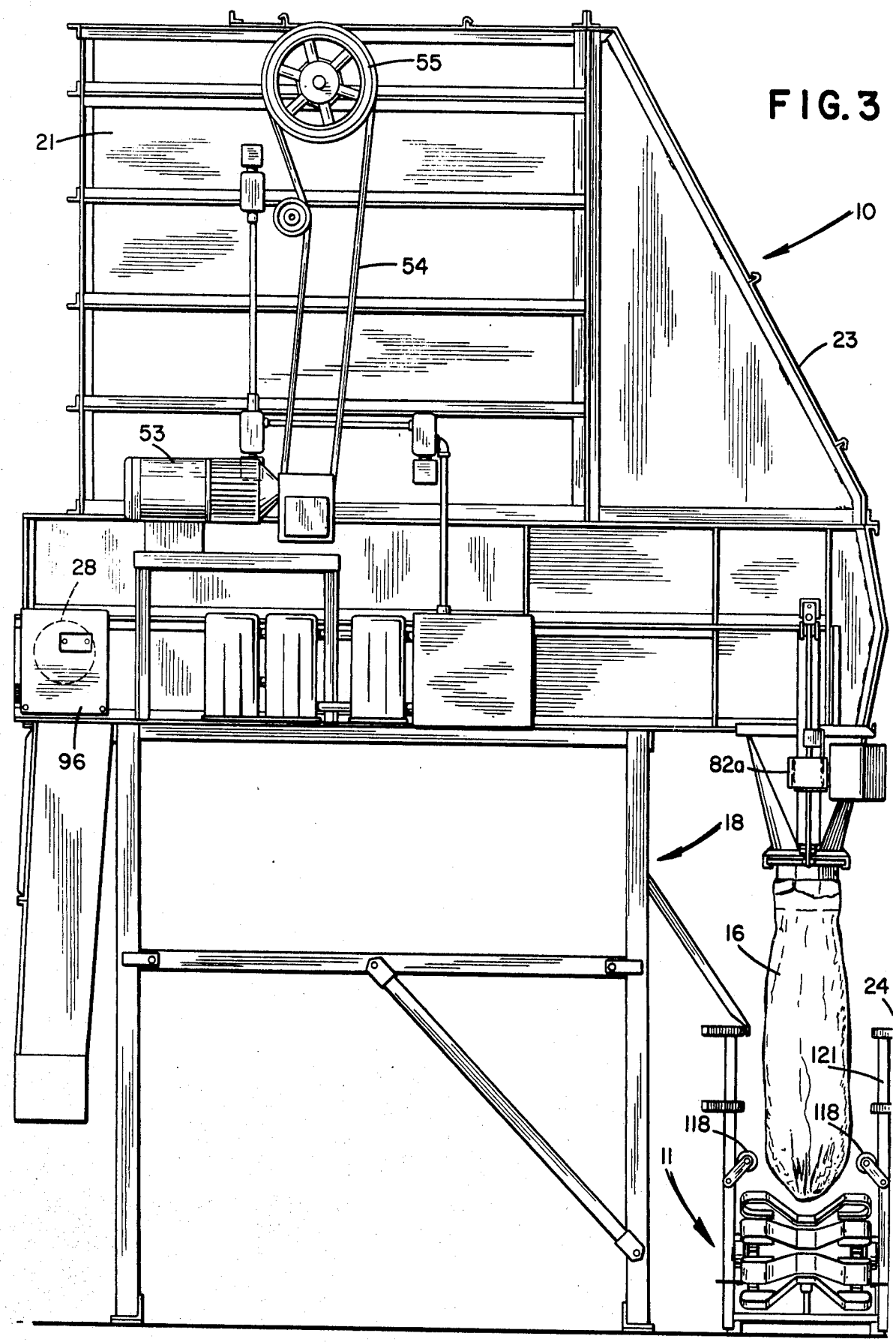

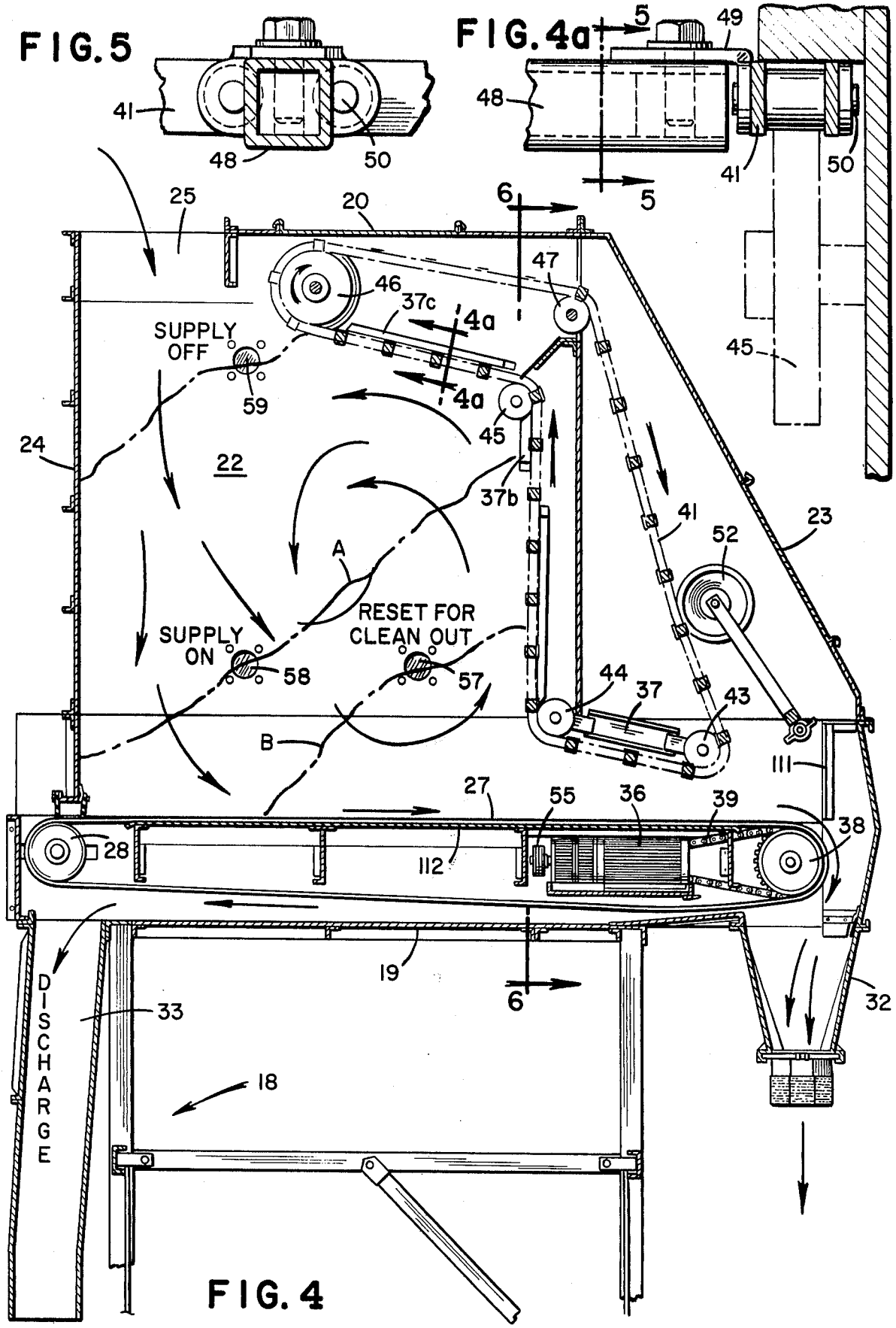

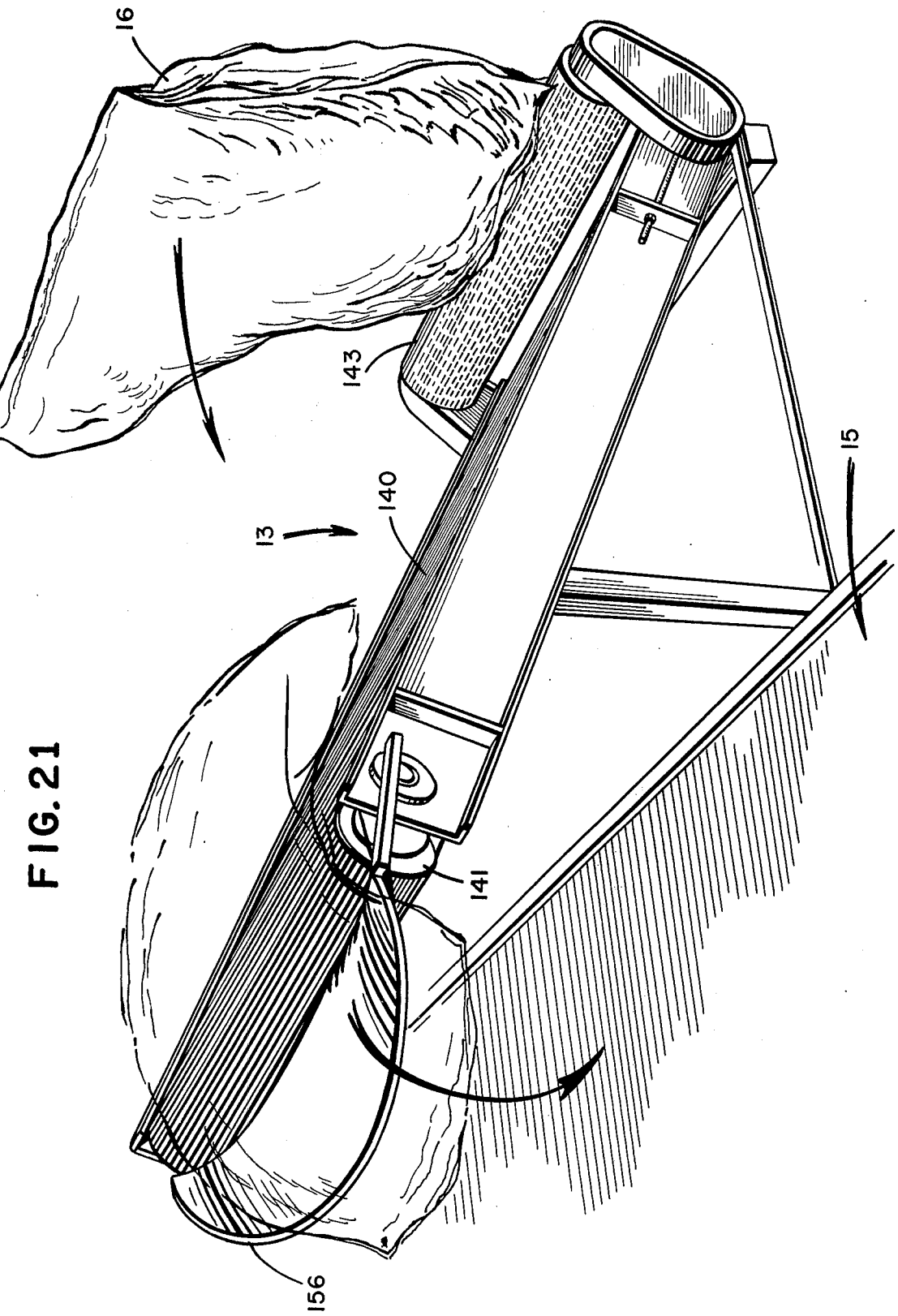

OPERATION PROGRAMMER

APPARATUS FOR BAGGING MATERIAL

This invention relates generally to apparatus for packaging a comminuted or other material occurring in the form of particles, shreds, fragments or the like and more particularly to apparatus adapted to be combined into a plant for bagging such materials and for conveying the bagged product from the bagging machine to storage or to a conveyance for shipping the bagged product.

Many materials which exist in the form of particles, shreds, fragments or the like such as tree bark which has been broken into pieces suitable for use as a mulch are sold in cloth, paper, plastic or similar bags. The usual apparatus for bagging the free flowing material includes a hopper having a means for discharging the material in response to gravity into a bag supported below the hopper. A means is usually provided for weighing or determining the volume of the material discharged into the bag. Most apparatus of this type is manually operated and requires closing and stacking of the bag by hand. Bags must be secured to the filling spout on most apparatus of this type by multiple clamps which are manually actuated when the bag is in place to be filled as well as after the bag has been filled. Since such apparatus is relatively slow in operation, the bags are filled and stacked in a suitable storage area and later loaded on a truck or other vehicle to transport them to the market. Apparatus of this type is expensive to operate because of the number of people required to operate it and requires storage space for stacking the bags to provide an inventory of stock to be drawn upon for shipping purposes. Moreover, most of the heretofore available apparatus does not measure the material accurately as it is bagged.

It has often been necessary when bagging materials which will not flow freely to use hand forks for filling the bag. In such instances the bag must be help open by a person or by other means such as by attaching it to four posts while it is picked up with a hand fork and placed in the bag.

An object of this invention is to provide an apparatus for packaging a material which occurs in the form of particles, pellets, shreds, fragments, granules or the like which is adapted to operate with a minimum number of operating personnel. Another object of the invention is to provide an apparatus for bagging such a material which is adapted to charge repeatedly measured volumes of material into bags, close the bags and transport them without interruption from the bagging machine to storage or preferably directly to a vehicle to be used for shipping the product from the packaging facility. Still another object of the invention is to provide apparatus adapted to charge shreds or fragments of such material and especially tree bark or the like into bags in measured volumes, close the bags and load the bags in a truck or the like in a continuous process with a minimum of operating personnel. A more specific object of the invention is to provide an apparatus for automatically charging accurately measured volumes of a material of the type described such as tree bark suitable for mulching plants into a bag or the like. Another more specific object of the invention is to provide a combination of devices into an apparatus which is adapted to automatically charge a material of the type described into a suitable bag, close the bag, and convey the closed, filled bag away from the charging apparatus and preferably to a suitable vehicle for conveying the bagged material from the bagging plant.

Other objects of the invention will become apparent from the following description with reference to the accompanying drawing wherein FIG. 1 is a diagrammatic illustration of one embodiment of an assembly of the devices provided by the invention;

FIG. 3 is a side elevation of the embodiment of FIG. 2;

FIG. 4 is a vertical longitudinal section of the bagging apparatus of FIGS. 2 and 3;

FIG. 4a is a fragmentary plan view taken along the line 4a—4a of FIG. 4;

FIG. 5 is a fragmentary section taken along the line 5—5 of FIG. 4a;

FIG. 21 illustrates in perspective the bag elevating conveyor of FIG. 18; and

The foregoing objects and others are accomplished in accordance with this invention, generally speaking, by providing a device for loading a bag with material of the type described which combines a means for detecting the presence of a bag in its loading position with a means for discharging from the temporary storage bin of the device a measured volume of material into the bag. The bag charging device has a discharge funnel and bag holder associated with means for actuating an endless belt disposed across the bottom of the storage bin only when a bag is supported on the bag holder. Means which can be adjusted by an operator to predetermine the volume of material discharged into a bag is provided for stopping the endless belt when the correctly measured volume of material has been delivered to the discharge funnel after actuation of the belt in response to the bag holder attachment. Means are also provided in the temporary storage bin of the device for automatically controlling the depth of material on the endless belt and to avoid bridging of the material or other phenomena above the endless belt which might cause voids or might otherwise interfere with flow of material on to the surface of the belt.

The apparatus provided by the invention automatically releases the bag after the material charged is inside, therefore, the operator needs only to place the bag on a discharge spout and actuate the foot switch. He is then free to turn, pick up and open another bag and place it on the spout as seen as the filled bag is automatically released.

The loading device provided by the ivention may be associated with any type of bag closing and stacking equipment to maintain at a minimum the number of persons required for its operation. With some materials such as tree bark suitable for mulching purposes, plastic bags such as thermoplastic polyethylene, polyvinyl chloride or the like may be used to advantage because the open end of the bag can be heat sealed. However, with other materials, burlap, cloth, paper or other type bags may be used and the loading device may be associated with conventional stitching or gluing devices for closing the open end of the loaded bag.

The invention contemplate suitable conveyors for supporting and continuously moving the bags in series from the loading device through a bag closing device to a point where the loaded, closed bags can be stacked for storage or for conveyance from the bagging plant.

Although the apparatus provided by the invention is especially advantageous for packing free flowing materials such as broken tree bark and granular fertilizer materials or the like, it is also useful for packaging materials which are not free flowing such as shredded wood or bark, fibrous material such as asbestos insulation, fiberglass or the like which has been packaged heretofore by hand or with pressing and baling apparatus.

Figure 1:
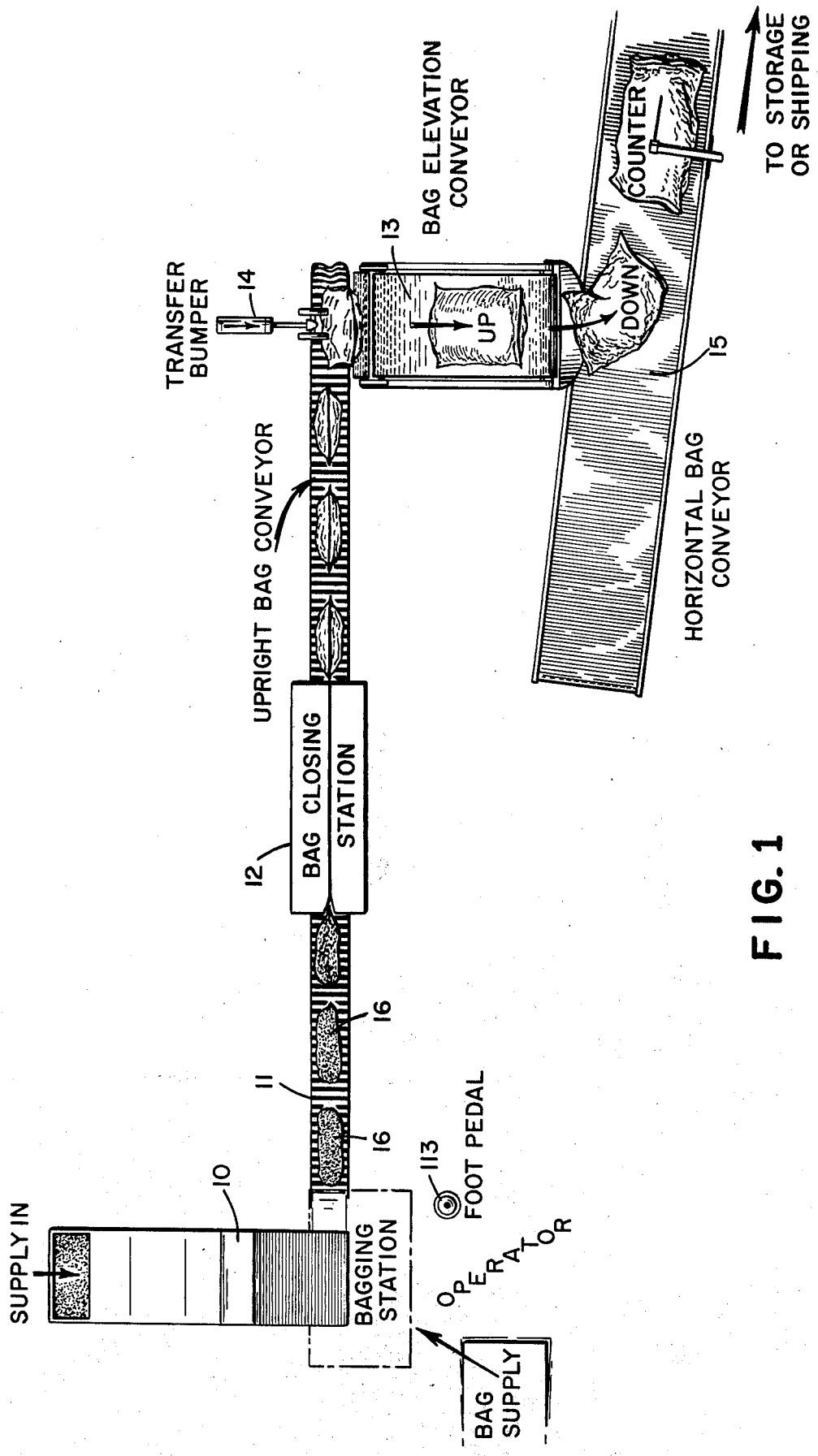

Referring now to the drawing, one embodiment of an assembly combining various devices of the bag loading apparatus provided by the invention is illustrated in FIG. 1. A combination temporary storage bin and load charging hopper 10 adapted to discharge a measured volume of broken pieces of tree bark or other material is disposed over an endless conveyor 11 at a bagging station where an operator places a plastic bag or the like about a combined discharge funnel and bag holder. A conventional bag closing device such as a heat sealing device for plastic bags, a stitcher, gluing device or stapler 12 is disposed over conveyor 11 at a point spaced longitudinally from the loading or bagging station in a position where the top portion of the bag must pass. The loaded bags 16 are carried by conveyor 11.

The bag closing device may be a pair of spaced heated rotating bands through which the sides of the bag 16 adjacent to its open end are pressed and heat sealed together. A second operator may be provided between the loading station and the bag closing device 12 to grasp the leading and trailing ends of the two sides of the bag 16 and pull them in opposite transverse directions until the sides are touching and the bag will enter the slots between the heated bands. The plastic bags 16 should be thermoplastic so the two sides are compressed together and become heat sealed together. Bag 16 may be a conventional polyethylene or the like bag prepared by cutting a blank from sheet material, folding it and heat sealing two of the three open edges to form a bag having an open top. The heat sealed portion of the bag is cooled with a water cooled member at the exit end of the heat sealer.

The closed bags 16 are carried by the conveyor 11 away from the cooling end of sealer 12. They may be removed from the end of conveyor 11 and stacked in storage or in a suitable vehicle which will transport them or, preferably, they are transferred mechanically, as illustrated in FIG. 1, to a second endless conveyor 13 by means of a bumper 14 and, if desired, to a third endless conveyor 15 running substantially parallel to conveyor 13. Conveyor 15 may be mounted on rollers or wheels so it can be moved with respect to conveyor 13 to adjust its load carrying length. For example, the discharge end of conveyor 15 may be in the trailer of a tractor-trailer rig and conveyor 15 may be backed away intermittently from the bags stacked in the trailer until the trailer is filled.

Referring now to FIGS. 2 through 14, a housing 17 encloses a material storage space inside load charging device 10 and is supported in spaced relation above a floor on a suitable frame structure 18. As illustrated best in FIGS. 2, 3 and 4, housing 17 has a bottom wall 19, a top wall 20, vertical sidewalls 21 and 22, a sloping front end wall 23 and a vertical back end wall 24 which are joined together to form a storage bin or hopper 10. Top wall 20 terminates short of end wall 24 (FIG. 4) to provide an opening 25 for adding material to hopper 10 such as from an endless conveyor 26 (FIG. 2) associated at its other end with a source of material to be packaged.

Figure 6:
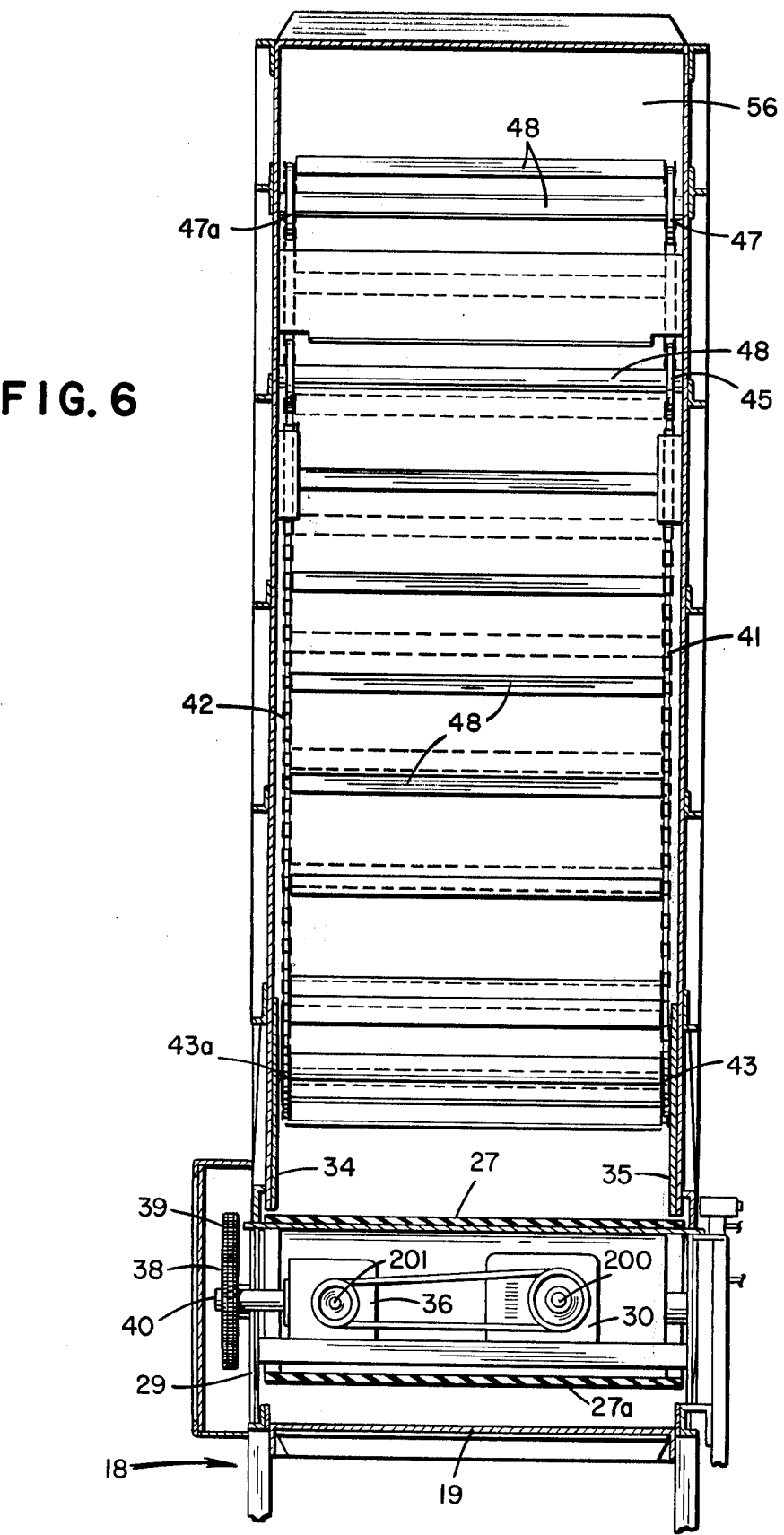
FIG. 6 is an enlarged cross-section taken along line 6—6 of FIG. 4.

An endless non-porous belt 27 looped around roller 28 and 29 extends across the bottom of the storage space of hopper 10 (FIGS. 4 and 6). Conveyor belt 27 extends across the width as well as the length of the storage space enclosed by housing 17. Conveyor 27 is driven by a motor 30 through a reduction gear 36 (FIG. 4), pulley wheels 200 and 201, a conventional sprocket wheel (not visible in the drawing) on gear box 36, sprocket wheel 38 and sprocket chain 39 fixed to the shaft 40 on which roller 29 is mounted.

As illustrated in FIG. 6, endless belt 27 extends across the width of the storage space of hopper 10 and shield members 34 and 35 are fastened to the walls 21 and 22, respectively, and cover the spaces between the edges of endless belt 27 and walls 21 and 22 to prevent substantial sifting of bark or other material below endless belt 27. However, some bark may cling to the surface of endless belt 27 after it has passed around sprocket wheel 28 or otherwise reached the space between the bottom reach 27a of endless belt 27 and bottom wall 19. Discharge spout 33 is provided to remove such bark and prevent accumulation thereof.

Sidewalls 21 and 22 of housing 17 are substantially perpendicular to bottom wall 19 throughout their height to avoid any sloping surface which might discourage material in the hopper 10 from flowing downwardly to endless belt 27. The edges of belt 27 extend beyond the lower edges of shield members 34 and 35 a sufficient distance to avoid the exposure of any crack between the edge of belt 27 and the inner surface of walls 21 and 22. The shield members 34 and 35 should be substantially perpendicular to the upper surface of belt 27 and the lower edges thereof should be almost flush with the upper surface of belt 27. Shields 34 and 35 may be provided with a lip along the top edges thereof which is attached to an angle iron fastened to the sidewall of the housing to space the shield an inch or so inwardly from the sidewall to insure that the edge of the belt is always covered. This avoids bark or other material from becoming lodged between the edge of belt 27 and the sidewall where it will cause wear of the belt edge.

The sidewalls of the hopper above belt 27 are vertical and parallel in all directions which is necessary for the chain and bag assembly to work properly. If the walls were tapered or stepped, material with poor flowing characteristics would become wedged and cause bridging or a cavity above the belt and loss of traction required to move material toward the discharge end. Even in free flowing materials tapered walls would create drag on the material and only that which was subject, directly or indirectly, to forces created by belt 27 would move toward the discharge end. Poor flowing materials due to their flow angle will induce less pressure toward the walls, thus create less friction. Free flowing materials could be fed to the bagger hopper by gravity from a hopper of unlimited size mounted above without the use of level controls since the feed hopper bottom would carry the weight of the material and flow from a simple spout which terminated inside the bagger hopper would cause the level of material in the feed hopper to be controlled by the flow angle of the material.

As shown in FIGS. 4 and 6, means is provided for stirring up material in the storage bin. A pair of laterally spaced sprocket chains 41 and 42 are looped about sprocket wheels 43, 44, 45, 46 and 47 and 43a, 44a, 45a, 46a and 47a, respectively. Sprocket wheels 44a, 45a, and 46a are duplicates of 44, 45 and 46 and are not visible in the drawing. A plurality of spaced cross-bars 48 are secured at their opposite ends to chains 41 and 42, spanning the distance therebetween. As shown in FIGS. 4a and 5, cross-bars 48 may be hollow metal bars which are square in cross-section. Bars 48 are fastened to links in the sprocket chains 41 and 42 by means of an L-shaped bracket member 49. Bracket member 49 is secured to an end of a bar 48 by a bolt 51. Idler wheel 52 is provided to insure proper tension on the chains 41 and 42.

Chains 41 and 42 are driven by motor 53 (FIG. 3), pulley 54, sheave 55 and sprocket wheels 46a and 46 about a circuitous path over guide members 37, 37a, 37b and 37c as illustrated in FIG. 4. Cross-bars 48 stir up the bark or other material as they are carried by chains 41 and 42 to prevent bridging of the particles and to insure distribution of material over the surface of endless belt 27. Vertical panel 56 (FIG. 6) extends across the width of the storage space of hopper 10 and to the top wall 20 to serve as baffle against the flow of bark to a point over the discharge end of the upper reach of belt 27 and through a discharge funnel or spout 32.

Figure 2:
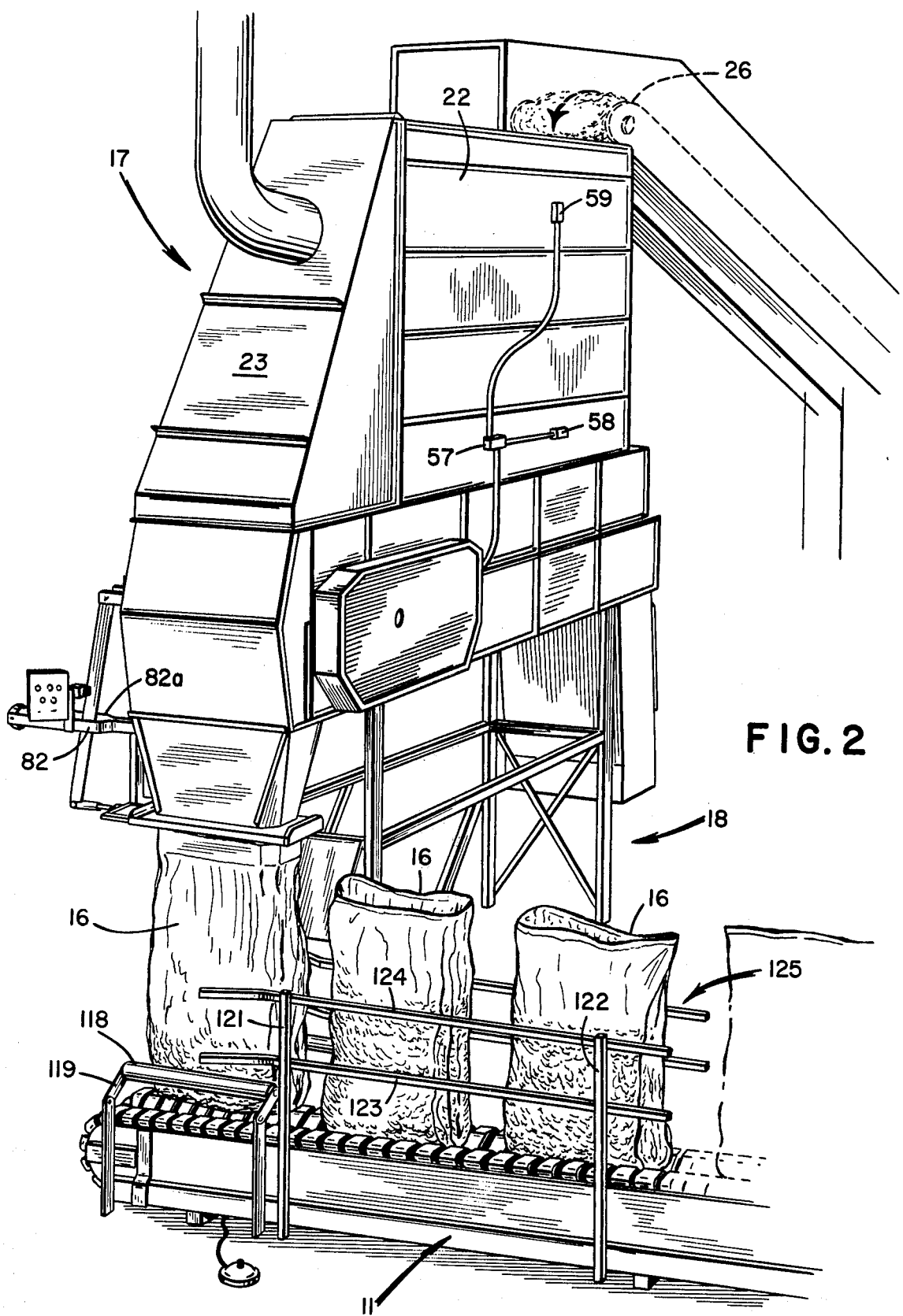
FIG. 2 is a perspective view of one embodiment of the bag charging device of the apparatus illustrated in combination with a fragmentary view of an embodiment of a conveyor for conveying a bag after it has been charged with a volume of bark from the charging device.

As shown in FIGS. 2 and 4, electric eyes 57, 58 and 59 are mounted in housing wall 22. Signal devices 57, 58 and 59 communicates electrically with a master control unit which at a signal from various manual or integral signal devices cause electric motors, air cylinders, clutches, brake, relays, etc. to operate in sequence or as programmed by the machine operator. These electric eyes are commercially available products and are connected electrically to a motor (not shown) which drives conveyor 26. One end of conveyor 26 is disposed in a source of tree bark or other material. As illustrated with broken lines A and B, the surface of the bark in the space above belt 27 becomes inclined as the bark is withdrawn by belt 27. When the bark level is to the right of eye 58 (FIG. 4), the motor and conveyor belt 26 are actuated to supply more bark above belt 27 until the level of the bark has reached eye 59. At this point a signal is sent to a switch which stops the rotation of conveyor 26 and the flow of bark into hopper 10. If it is desired to empty hopper 10, the motor driving conveyor 26 is manually turned off so it will not be started by eye 58. Eye 57 is connected to a switch which stops motor 30 and conveyor 27 and requires manual actuation to restart motor 30. This prevents operation of conveyor 27 when there is insufficient bark in the hopper to charge a bag with the required amount of bark. In some instances the bagging system is used to package materials of several grades or it is desirable for other reasons to remove all materials from the bagging unit. An override switch is provided which will cause the unit to cycle once each time the override switch is depressed and the foot pedal actuated when material supply is below signal 57.

The shields 34 and 35 over the edges of belt 27 and the endless stirring member formed by chains 41 and 42 enclose a space above belt 27 through which material is discharged into discharge funnel 32. The area of this space and the rotation of belt 27 determine the volume of material discharged into funnel 32. Because of the presence of shield members 34 and 35, the agitator formed on chains 41 and 42, and belt 27, low specific gravity materials which will not fall at 90° in response to gravity may be packaged in the device provided by the invention. The movement of the endless member formed by chains 41 and 42 at the same time as movement of endless belt 27 prevents material from becoming wedged at the end of belt 27 and jamming of the machine.

As material moves with belt 27, cross-bars 48 on chains 41 and 42 which are preferably moving faster than belt 27, direct upward thrust within the material at a level contacted by the chain end bar assembly. Since stringy or poor flowing materials tend to wad or move in lumps, cavities will be left in the materials which will traverse the belt under chain assembly 41 and 42. Slides 27a and 37b which engage the chains but leave openings between the bars 48 assure constant operating levels. Weighted idler 52 causes any slack created as the chains wear to be taken up thereby eliminating the possibility of the chain and bar assembly being loosely draped in the areas where consistent paths are important.

As belt 27 moves in the direction of the arrow in FIG. 4, the materials, which passes under the chains 41, 42 and bar assembly 48 is trimmed and spread in a uniform thickness on belt 27. The majority of the material removed by the belt and bar assembly to provide the desired level on belt 27 is directed up, however, the tapered passage between the chain-bar assembly and belt 27 casues the chain and bar assembly to move excess material toward the back of the storage and then upwardly. Some of the material moving upwardly can also fall between bars 48 of the chain and bar assembly. Therefore, material which is above the chain and bar assembly at the tapered channel as well as between bars 48 and plate 56 will flow by gravity into cavities which might be created when the excess material carried by belt 27 is directed upwardly.

Chains 41 and 42 are moved toward the back of the unit in the upper section of the hopper. Otherwise, much of the material would be carried ovver wall 56 by the chain and bar assembly. There are other reasons the chain is directed back including the necessity of assuring the absence of material which would, if present between chain and drive sprockets, cause sprocket-chain engagement interference. With the provided guide member and chain assembly, the chains run clean over sprocket wheels 46 and 46a.

It will be noted that shields 37, 37a, 37b and 37c are adjacent to the chains 41 and 42 in all areas where the chain-bar assembly communicates with materials being measured. These shields prevent the material from being damaged or ground up as the chains 41 and 42 pass over and under idlers 44 and 45 as well as sprockets 46. They also serve, as previously mentioned, to assure that the chain and bar assembly follows the exact path desired for most efficient functioning where it communicates with the material being measured.

The mechanism which deposits tree bark discharged over the end of endless belt 27 into a bag 16 is illustrated in detail in FIGS. 7 through 11 and is shown in position with respect to the remainder of load measuring and charging device 10 in FIGS. 2 through 4. A discharge funnel or spout 32 which is substantially rectangular in cross-section is provided about a discharge opening in bottom 19. The housing which forms funnel 32 has an inverted frusto-pyramidal shape with its base or end of greatest dimensions attached to and depending below the bottom wall 19 of hopper housing 17. Both the top and bottom of funnel 32 are open for the passage of particles of tree bark or other material therethrough.

Figure 9:
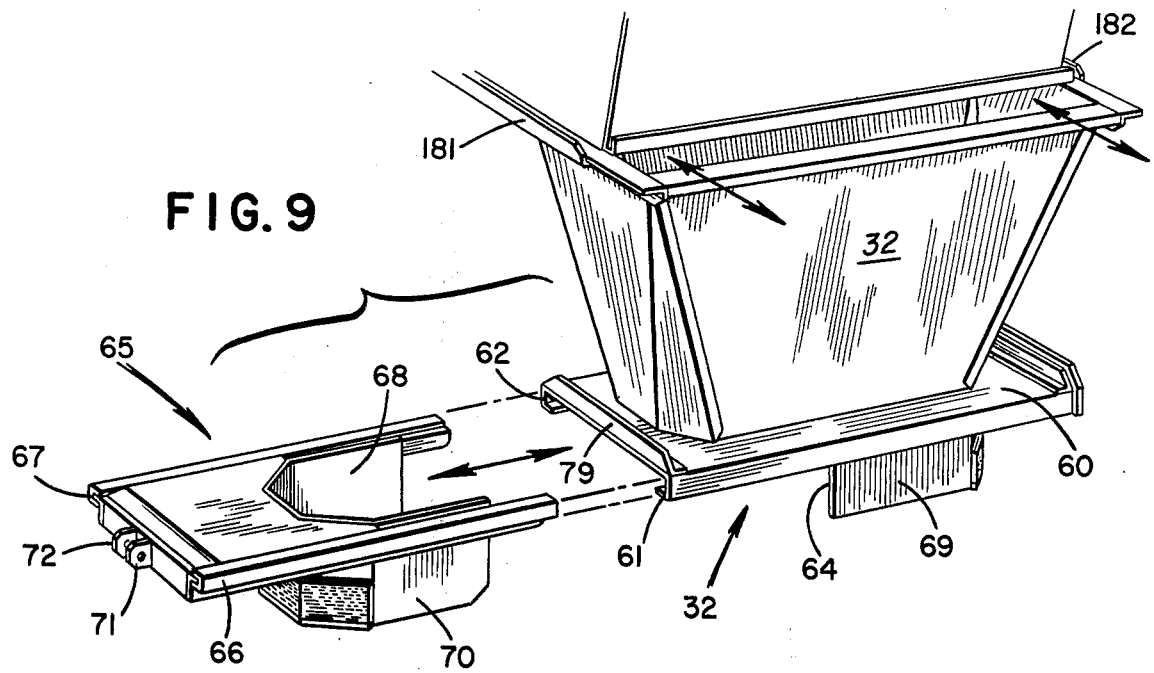
FIG. 9 is an exploded fragmentary view in perspective of the bag holder and discharge funnel of the hopper.
Figure 10:
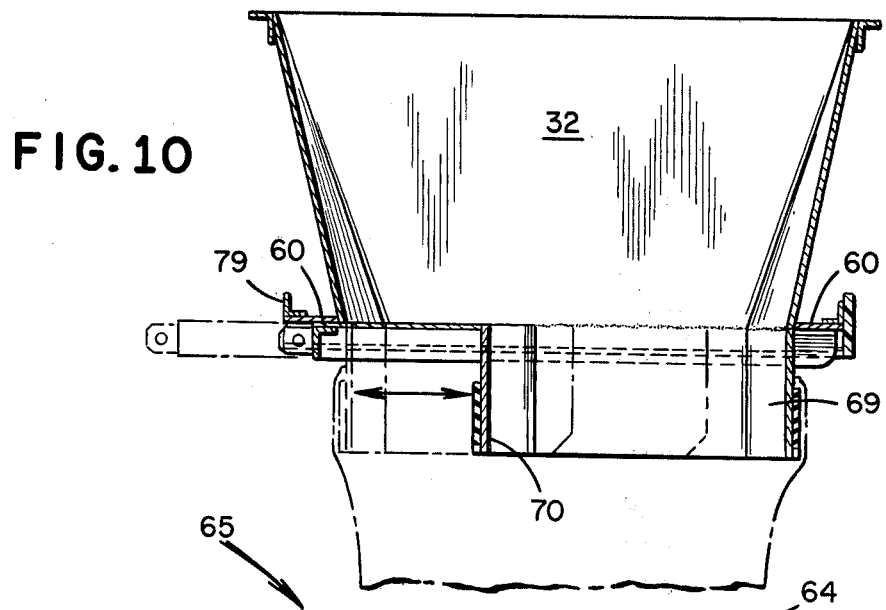
FIG. 10 is a vertical longitudinal section through the discharge funnel and bag holder of FIG. 9.
Figure 11:
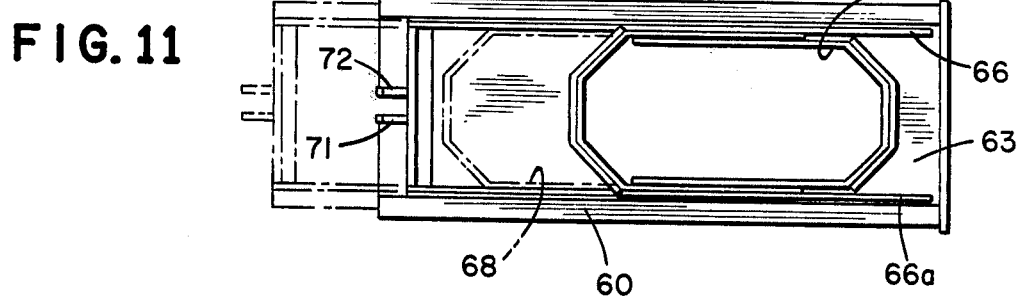
FIG. 11 is a bttom plan view of the bag holder and funnel of FIGS. 7 - 10.

As shown in FIG. 9, a panel 60 is welded or otherwise secured to the bottom edge of the housing which forms funnel member 32. This panel 60 projects outwardly in a plane perpendicular to the vertical axis of funnel 32 about the lower open end thereof. Panel 60 is bent downwardly and inwardly along opposite edges to form L-shaped lips 61 and 62, which combine to form a slide or track. A pair of panel members 63 and 65 have guide rails 66, 66a, 67 and 67a extending along the sides thereof which are adapted to slide in the tracks provided by lips 61 and 62. Panel 63 (FIG. 11) has a generally U-shaped opening therein defined by legs which extend outwardly from the end of the panel. The length of panel 63 is such that it covers less than the length of the lower end of funnel 32. A second panel 65 (FIG. 9) has rails 67 and 67a which extend along the edge of each side thereof adapted to slide in the track formed by lips 61 and 62. A U-shaped opening 68 similar to opening 64 but of greater cross-section is provided in member 65. When member 65 is moved in the track to the right as shown in FIGS. 10 and 11, the legs about opening 68 telescope about the legs of panel 63 and the base of opening 68 combines with opening 64 to form an octagonal shaped opening like that illustrated in solid lines in FIG. 11.

An open ended depending flange 69 is secured to the bottom of panel 63 about opening 64. A similar flange 70 is secured to the bottom of panel 65 bout opening 68. The ends of flange 69 slide over the ends of flange 70 to form a generally elliptically shaped member which serves as a holder for a bag 16. When member 65 is in the position shown in solid lines in FIG. 10, the length of the bag holder formed by flanges 69 and 70 is less than the width of the bag 16 to be loaded with bark. A pair of laterally spaced perforated tabs 71 and 72 are secured to the exposed end of panel 65 shown at the left in FIG. 9.

Figure 7:
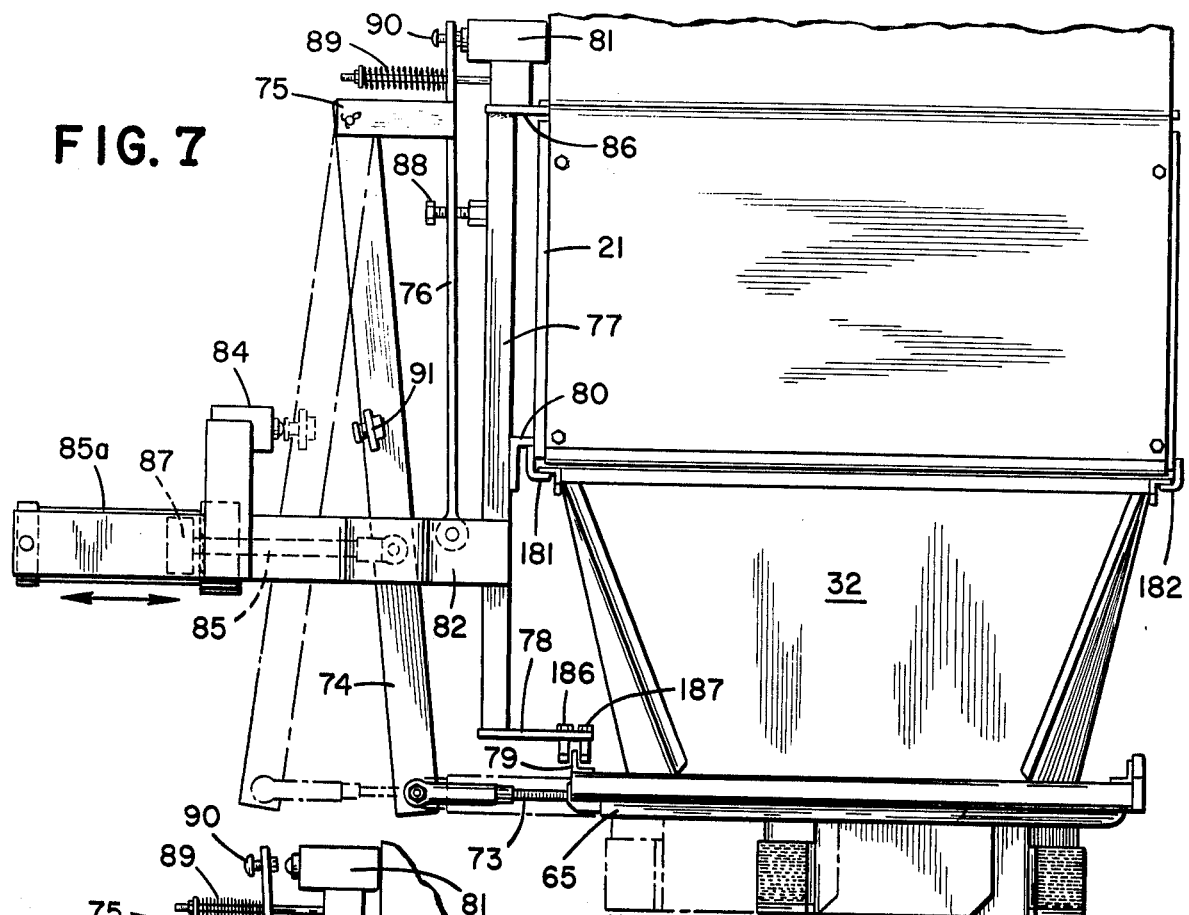
FIG. 7 is a fragmentary front elevation of the bag holding and discharge funnel portion of the apparatus of FIGS. 2 - 4.
Figure 8:
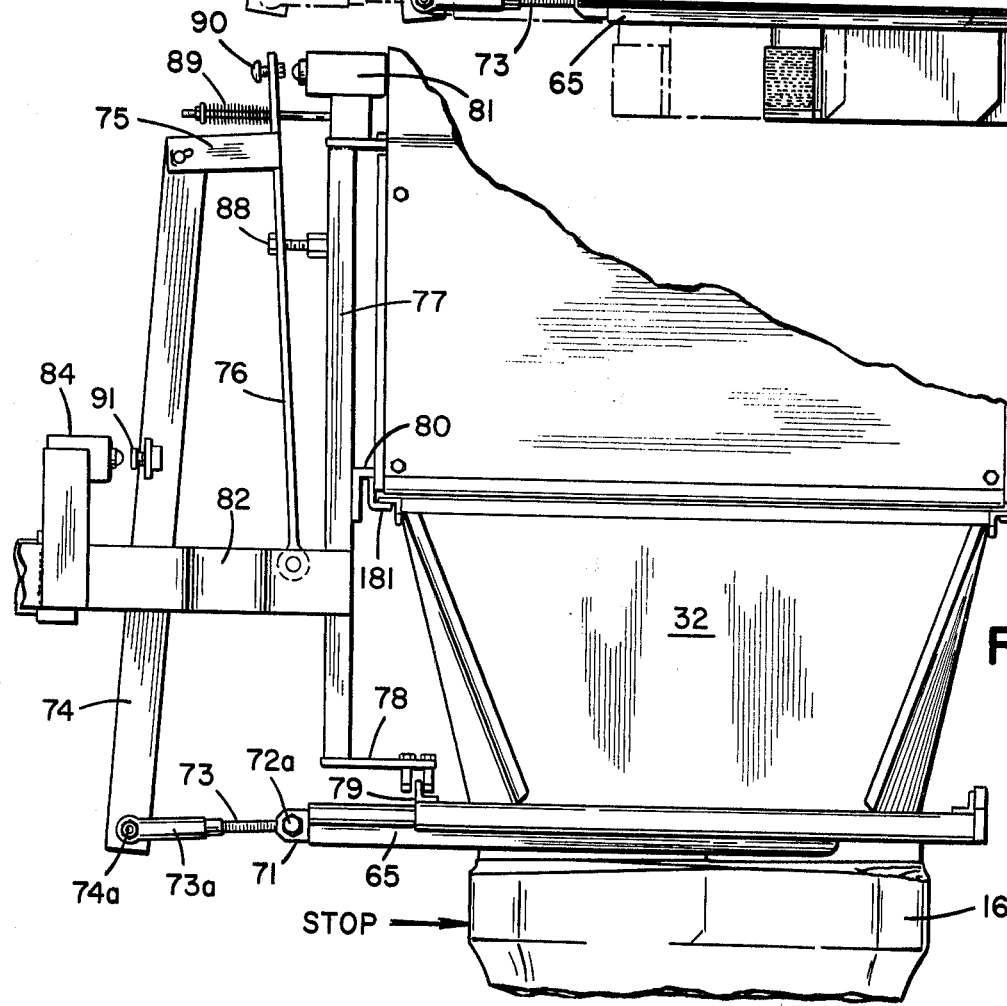
FIG. 8 is a fragmentary front elevational view similar to that of FIG. 7 having a bag associated with the bag holder.

In order to accommodate bags of various widths, the funnel 32 and bag holder assembly is removably associated with hopper 10. As illustrated in FIGS. 7 and 9, L-shaped members 181 and 182 are secured to the bottom of hopper 10 to form tracks along the lower edge of sidewalls 21 and 22. Flanges 183 and 184 are secured along the sides of funnel 32 at the top edge thereof and slide over members 181 and 182 to fasten the funnel 32 and bag holder to hopper 10. When the size of the bag 16 being filled is changed, a funnel having a larger or smaller bag holder may be substituted for the one previously used.

Bag filling funnel 32 is designed in such a manner that when the bag is attached to the bag holder assembly, the opening through which material flows into the bag is approximately the same shape as a horizontal cross-section of the filled bag at a point halfway from top to bottom. This causes minimum turbulence in the flow of material into the bag, prevents bridging of material with poor flow characteristics and allows material to enter the bag opening at a maximum rate. Since only the top section of the bag need be opened to allow it to be placed over the bag holder unit when it is in its closed position illustrated in FIG. 7 and the remainder of the bg can remain collapsed, less air must be displaced by materials being packaged where it enters the bag. There is always some air which must be displaced and since the rate of flow through the bag filler funnel 32 is constant, maximum flow rates which allow air in the bag to flow up into the discharge funnel 32 are possible. An important part of this assembly is that the bag fits snugly around the bag holder so there is no space for the escape of dust into the surroundings which would be very discomforting to the operators. An exhaust fan may be attached to funnel 32 to pull a slight draft through the funnel so that when the bag is dropped dust inside the bagging machine, which is usually present in materials being packaged, as well as that at the top of the filled bag will be drawn through the funnel opening and conveyed to a dust collector.

It is pointed out that conventional bagging machines which operate on either a weight or volume basis deposit the material being bagged into a cavity with parallel or cylindrical vertical walls above the bag spout where it is weighed or measured and released to a funnel shaped bagger spout by quickly opening the bottom of the cavity. Such systems are very difficult to enclose to prevent dusty working conditions. Also the prior art baggers use a fixed diameter bag hanger spout which must be small enough for the bags to be easily slipped thereover. Those which use conventional open mouth bags have mechanically operated hanger clamps which must the manually operated for the bag to be released.

There are also machines available which form bags from sheet materials as they are filled. Also, one machine uses bags which are attached to each other in a roll and have a top embossed section through which curved rods slide causing the top to be opened when under a discharge spout. The top section is cut away and discarded after the bags have been closed and separated from each other. This is a very dusty operation as material openly drops from one section to another and the bag material loss is quite expensive. Units of this type are used primarily for filling small bags with free flowing materials. The funnel and bag holder assembly of the apparatus of this invention avoids the disadvantages of such dusty operations.

Tabs 71 and 72 are used to connect plate 65 with means for moving plate 65 with respect to plate 63 in the tracks formed by lips 61 and 62. One end of an adjusting screw 73 (FIG. 8) is pivotally secured to tabs 71 and 72 by bolt 72a. The other end of screw 73 is attached to clevis 73a which is pivotally secured to the lower end of a vertical lever arm 74 with bolt 74a. A stationary strut 77 is secured at its upper end to wall 21 of the housing by a bar 86 and is disposed vertically alongside wall 21 in spaced parallel relationship. An angle iron bracket 80 secures strut 77 to wall 21 adjacent to bottom wall 19 of the housing. Strut 77 extends below bracket 80 and a horizontal member 78 is secured to the lower end thereof. An angle iron 79 is secured along the edge of panel 60 to provide an upstanding flange. A pair of spaced pins 186 and 187 carried on bar 78 fit on opposite sides of the upstanding flange to stabilize plate 60 against movement with panel 65 as it is moved in and out of the track of funnel 32. A mechanically actuated switch 81 is supported above bar 86.

A pair of laterally spaced horizontal members 82 and 82a are welded to opposite sides of strut 77 and bent outwardly to form a U-shaped member which accommodates the width of a pneumatic cylinder 85a. Members 82 and 82a are secured to the opposite sides of cylinder 85a. A vertical member 83 supports a switch 84 above members 82 and 82a. Lever arm 74 extends vertically from clevis 73a between members 82 and 82a and is pivotally secured at its upper end to one end of a horizontal member 75. The other end of member 75 is fixed to a lever arm 76 which is pivotally secured at one end between members 82 and 82a. Lever 76 extends above bar 75 and carries a bolt 90 adapted to contact switch 81 when lever 76 is substantially parallel to strut 77. A spring 89 urges lever 76 towards switch 81. A bolt 88 secured to strut 77 projects outwardly therefrom through a loosely fitting opening in lever 76. The distance lever 76 can travel from switch 81 as it pivots on members 82 and 82a is limited by the adjusting of the nut on the end of bolt 88.

A piston rod 85 is extended and withdrawn from pneumatic cylinder 85a by piston 87 as fluid pressure in cylinder 85a is changed on the opposite sides of piston 87.

A contact member 91 is positioned on lever 74 where it will touch the contact point of switch 84 when lever 74 is moved to the position shown in broken lines in FIG. 7. As pointed out above, when member 65 is positioned in its extreme righthand position with piston rod 85 extended as illustrated in solid lines in FIG. 7, the perimeter of the bag holder is less than the dimensions of the open end of a bag 16. Hence, the open end of the bag may be placed about the holder. The length of screw 73 is adjusted to the point where the distance that member 65 moves when piston rod 85 is withdrawn into cylinder 85a is greater than the dimensions of the opening in bag 16. Hence, when no bag is on the bag holder, members 65, 73 and 74 can be pulled by piston rod 85 until stopped by contact of member 91 with switch 84. When contacted, switch 84 reverses the hydraulic valve between the source of air under pressure and cylinder 85a so that fluid is directed to the opposite side of piston 87 and piston rod 85 is extended with members 74, 73 and 65 being moved back to the position shown in solid lines in FIG. 7. The operator may then place a bag over the bag holder.

When a bag is about the bag holder and piston rod 85 is withdrawn into cylinder 85a, the sliding movement of member 65 in the track provided by lips 61 and 62 is stopped by the bag when the bag holder has moved to where the bag fits tightly thereabout. The length of member 73 and the position of switch 84 are such that point 91 does not contact switch 84 when expansion of the bag holder is stopped by the bag. When movement of member 73 is stopped by the bag, piston rod 85 continues to pull on lever 74 which then moves arm 75 and pulls rod 76 away from switch 81. The movement of rod 76 is stopped by the nut on bolt 90 before member 91 strikes switch 84. Upon the opening of switch 81 a signal is sent to motor 30 to start rotation of endless belt 27.

Figure 12:
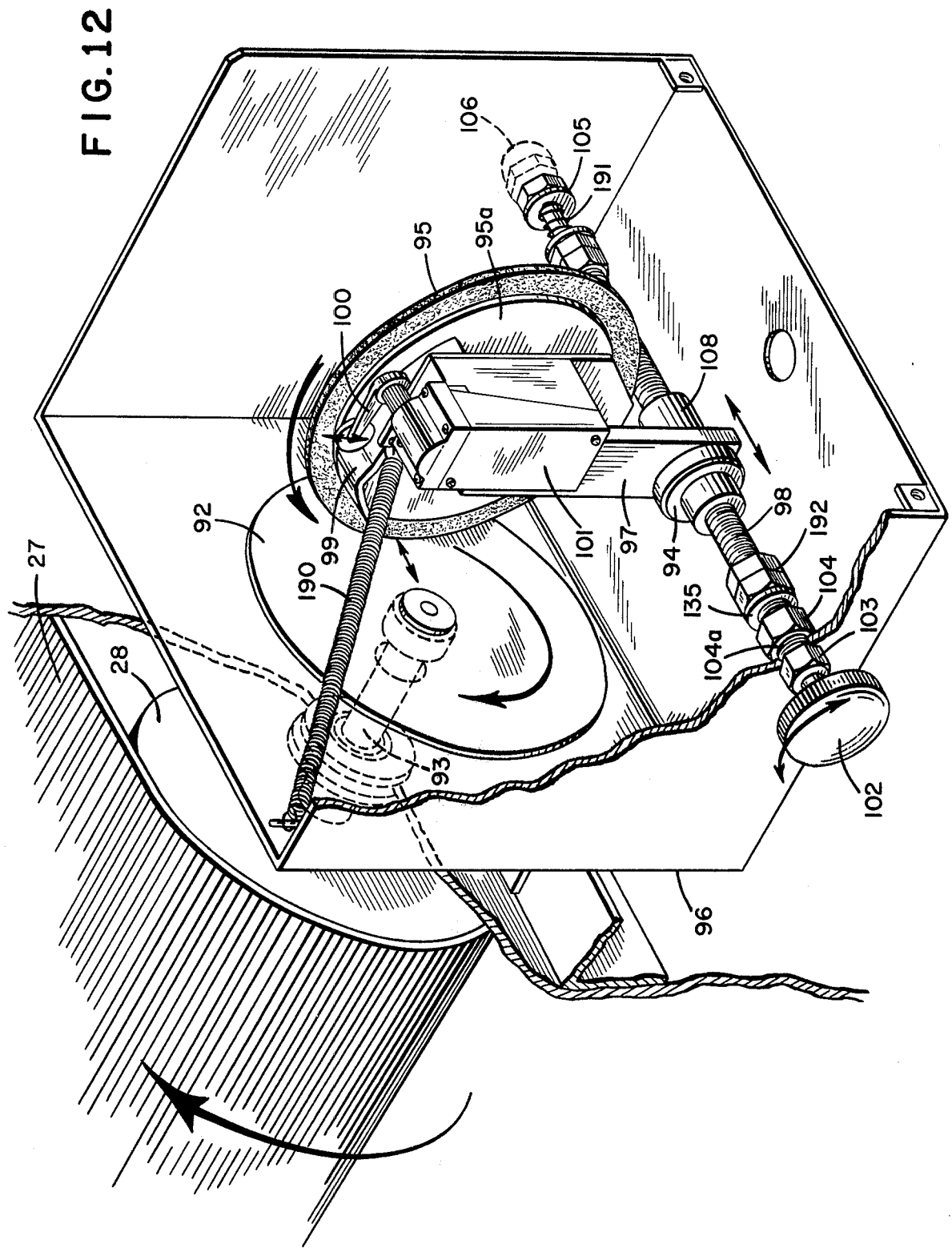
FIG. 12 is an enlarged perspective view of apparatus for controlling the volume of material discharged from apparatus into a bag.
Figure 13:
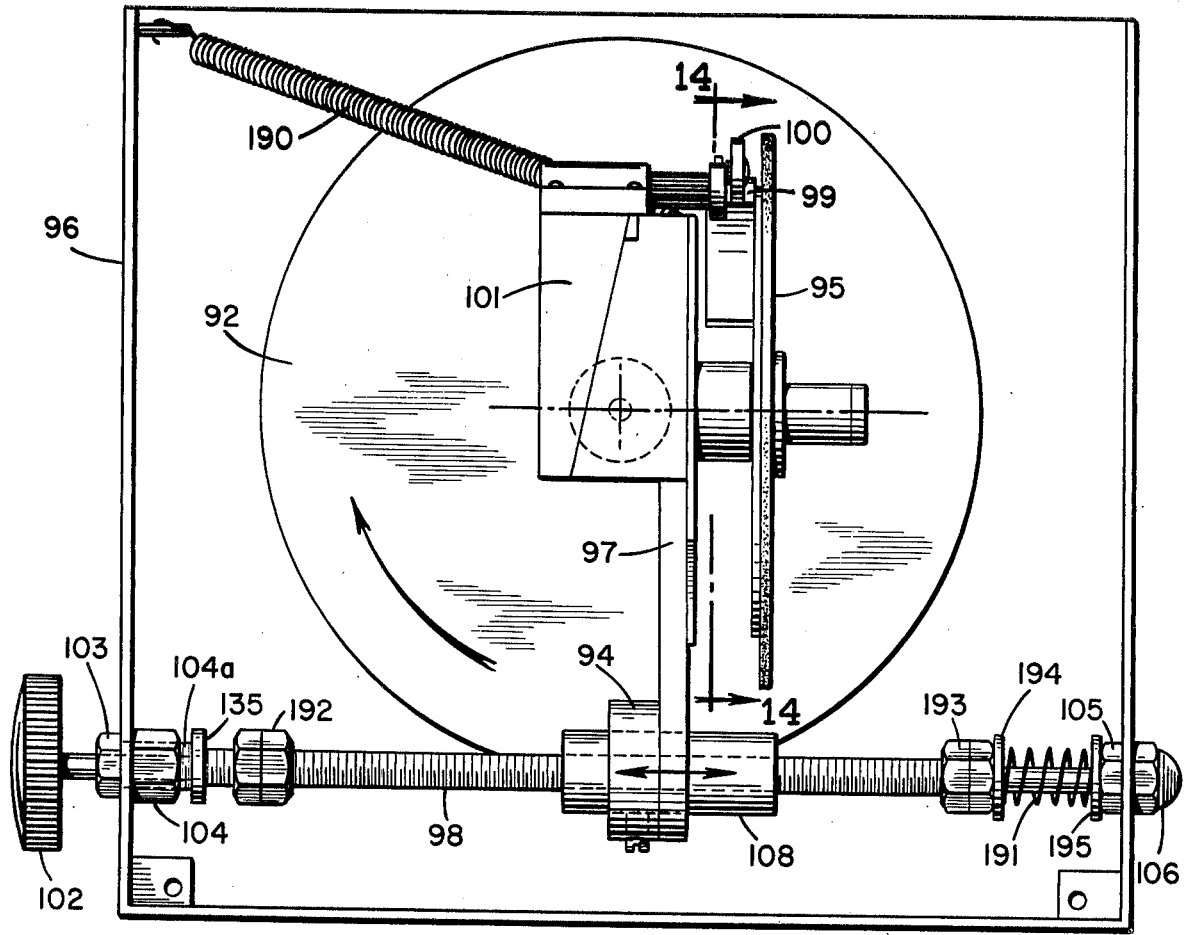
FIG. 13 is a front elevation of the apparatus of FIG. 12 with the front of the housing removed.
Figure 14:
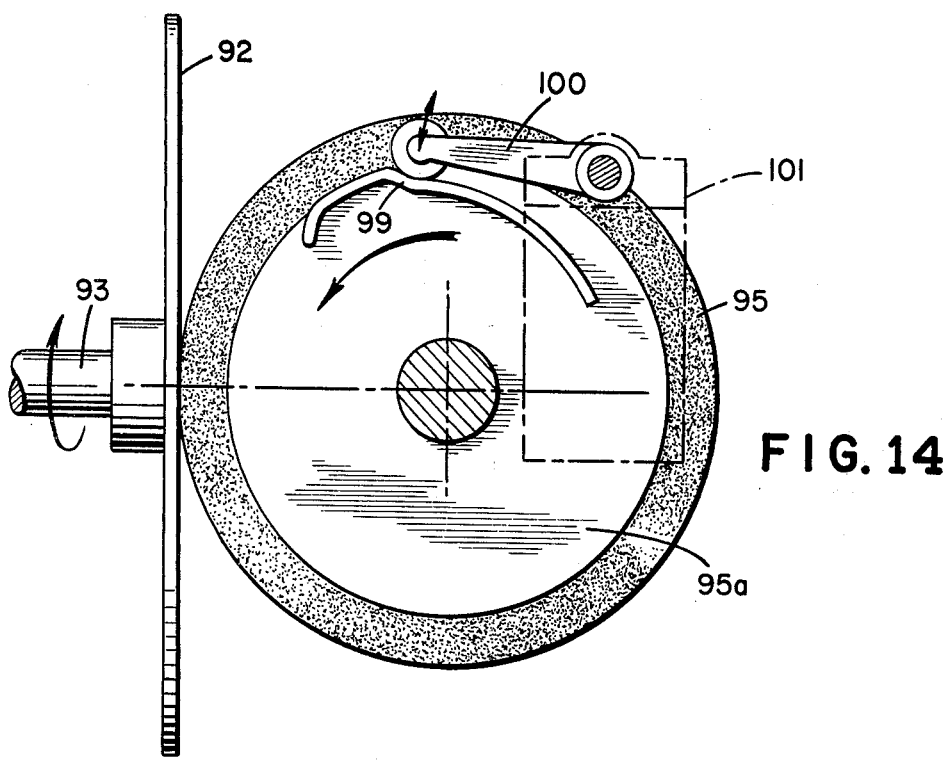
FIG. 14 is an enlarged view taken along the line 14—14 of FIG. 13.

As illustrated in FIGS. 12, 13 and 14, means provided for determining the length of travel of belt 27 to deliver a measured volume of tree bark or other material to funnel 32. A disc 92 is fixed on shaft 93 for rotation therewith. As stated above, endless belt 27 is looped about rollers 28 and 29. Roller 28 is also fixed on shaft 93 for rotation therewith. Disc 92 and a second disc 95, lying in a plane substantially perpendicular to that of disc 92, are enclosed in a housing 96. Clutch disc 95 is coated with asbestos, is secured face to face to a metal disc 95a and is disposed so its peripheral edge touches the face of disc 92. Disc 95a is supported on a shaft by a suitable plate member 97. Plate 97 has an opening therethrough and a hub 94. A sleeve 108 is threadably mounted on a shaft 98 and through the opening in plate 97. A cam surface 99 is provided on the edge of disc 95a and a cam follower 100 is supported on a limit switch 101 supported by plate 97.

Shaft 98 passes through a bearing in an opening in one sidewall of housing 96. The bearing is formed by the head of a bolt 103 and a nut 104 on opposite sides of the wall. That portion of the shaft 98 to the left of washer 135 in FIG. 13 is not threaded and passes through a bore drilled through bolt 103. Shaft 98 is threaded between washers 135 and washer 194. Shaft 98 is not threaded to the right of washer 194 and passes through a bearing formed by stud 105 and acorn nut 106. The radial position of the edge of disc 95 on the face of disc 92 is determined by positioning the plate 97 on shaft 98 by rotation of knob 102. Sleeve 108 moves along shaft 98 when the shaft is rotated by turning knob 102. A thrust spring 191 is disposed about shaft 98 between washers 194 and 195 and exerts a braking action between shaft 98 and stud 104 sufficient to prevent free rotation of shaft 98 during normal operation by thus braking action can be overcome and knob 102 can be rotated by hand as desired.

A coil spring 190 secured at one end to housing 96 and to a corner of limit switch 101 tends to bias the support of disc 95 towards the face of disc 92 and towards the center of disc 92. The threads are removed from the ends of shaft 98 so studs 103, 104 and 105 and acorn nut 106 do not turn therewith and form bearings for shaft 98. Double nuts 192 and 193 are fixed for rotation with shaft 98 and stop hubs 94 and 108 to limit the distance of travel of plate 97 on shaft 98. The center lines of discs 92 and 95 are on the same level and lie in planes perpendicular to each other.

Limit switch 101 is actuated by cam follower 100 and signals motor 30 to stop after one revolution of disc 95 by disc 92. Hence, the degree or number of rotations of disc 92 and of roller 94 and the length of travel of belt 27 while disc 95 rotates one revolution depends upon the point on the radius of disc 92 touched by the edge of disc 95. The closer disc 95 is to the center of disc 92 the longer the distance of travel of belt 27 and the larger the volume of material discharged into funnel 32 and bag 16. The thickness of the layer of material discharged from conveyor 27 is determined by the spacing between the chain-bar assembly and the upper surface of belt 27. The upper reach of conveyor belt 27 is supported against sagging by a plate 112. A food pedal switch 113 is provided near funnel 32 for an operator to start the loading of a bag by setting the valve to direct fluid into cylinder 85a where it will move the piston 87 in cylinder 85b to withdraw piston rod 85.

To operate the bagging part of the apparatus, the operator places the open end of a bag about the bag holder formed by flanges 69 and 70 depending below plate members 63 and 65 of funnel 32. He then depresses the foot pedal 113 to reverse the pneumatic valve so air enters cylinder 85a to withdraw piston rod 85 into the cylinder 85a. Lever 74 pulls clevis 73a and plate member 65 in a direction away from plate 63 until flange 70 reaches the point where the wall of the bag fits tightly about the bag holder. This supports bag 16 about the discharge opening of funnel 32. The bag stops the movement of lever 74 before contact 91 strikes switch 84 and rod 76 is pulled away from switch 81. This actuates motor 30 which rotates belt 27. Disc 92 rotates with the shaft 93 and disc 95 frictionally engaging the face of disc 92 is rotated. After one revolution of disc 95, the cam follower 100 actuates limit switch 101 which stops motor 30. While endless belt 27 is moving, a measured volume of bark is discharged through funnel 32 into bag 16. The switch 101 actuated by cam follower 100 also actuates the solenoid controlled valve to direct the flow of fluid into cylinder 85a to extend piston rod 85 therefrom and to slide plate 76 towards plate 63 and thereby reduce the peripheral dimensions of the bag holder. Movement of the bag holder to the position where a bag will be dropped is delayed long enough after the belt 27 has stopped to permit all of the material in funnel 32 to fall into the bag before the bag is dropped. The loaded bag will then fall from the bag holder and the loading cycle can be repeated.

If, on the other hand, the operator has not placed a bag 16 over the bag holder before he depresses the foot pedal, movement of plate 65 will not be stopped before contact 91 on lever 74 strikes switch 84. A signal will then be sent to the solenoid control valve to reverse the flow of compressed air into cylinder 85a and extend piston rod 85 to close the bag holder. Bolt 90 will not move from switch 81 so conveyor 27 will not be rotated.

When belt 27 is in operation, material flows along line (A). When belt 27 is stopped quickly by an electrically controlled brake in motor, clutch and brake assembly 30, material falls off belt 27 at an angle which is less than the normal flow angle of the material at rest due to the inertia created when belt 27 was suddenly stopped. The sudden stop of belt 27 which causes the material on belt 27 at the discharge point to be discharged at an angle less than that which it would flow when at rest causes the material flow to be completely stopped instantly.

Figure 15:
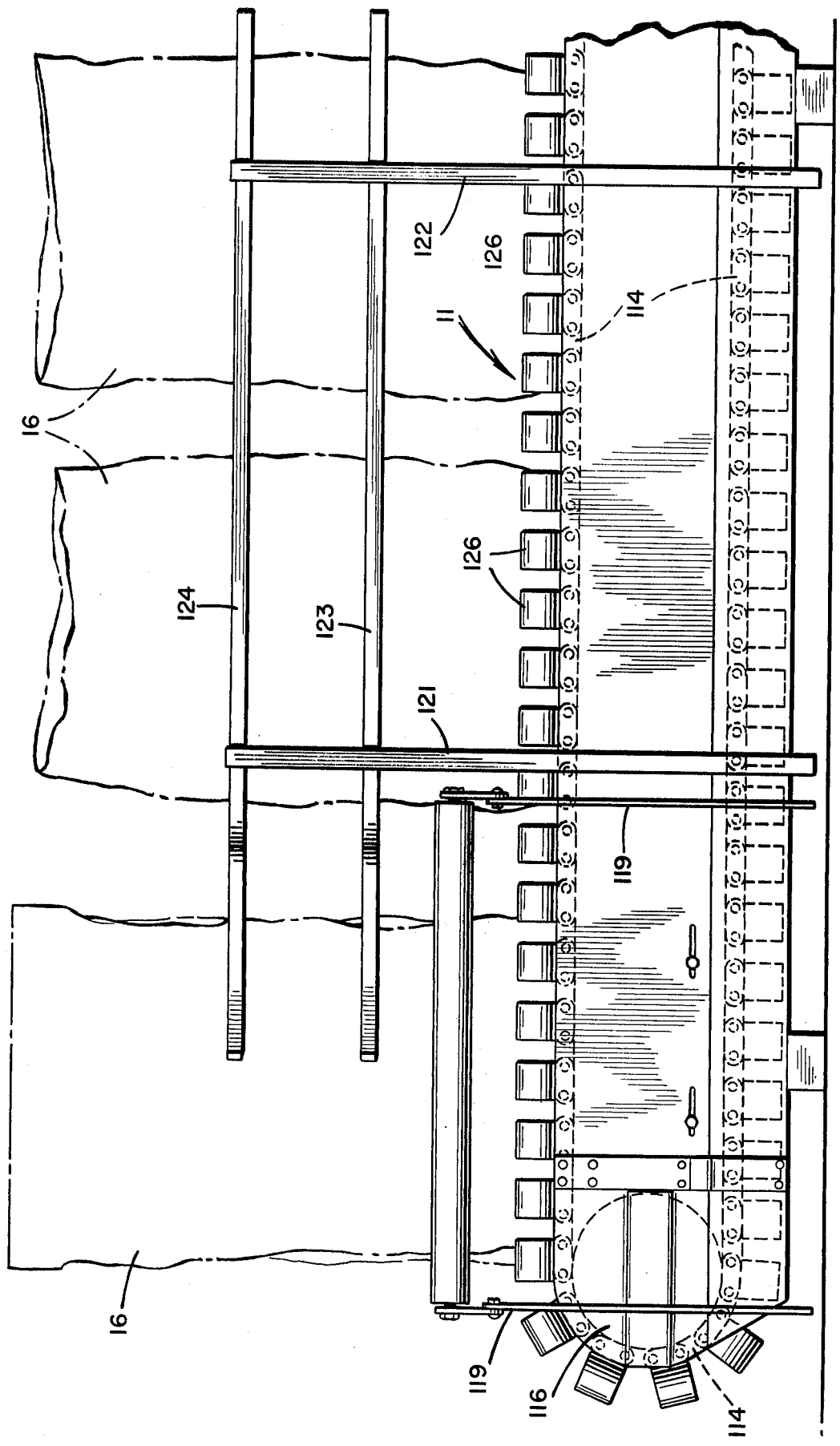
FIG. 15 is a fragmentary front elevation of that end of an embodiment of a conveyor adjacent to the loading hopper for transporting a loaded bag towards means for closing its open end.
Figure 16:
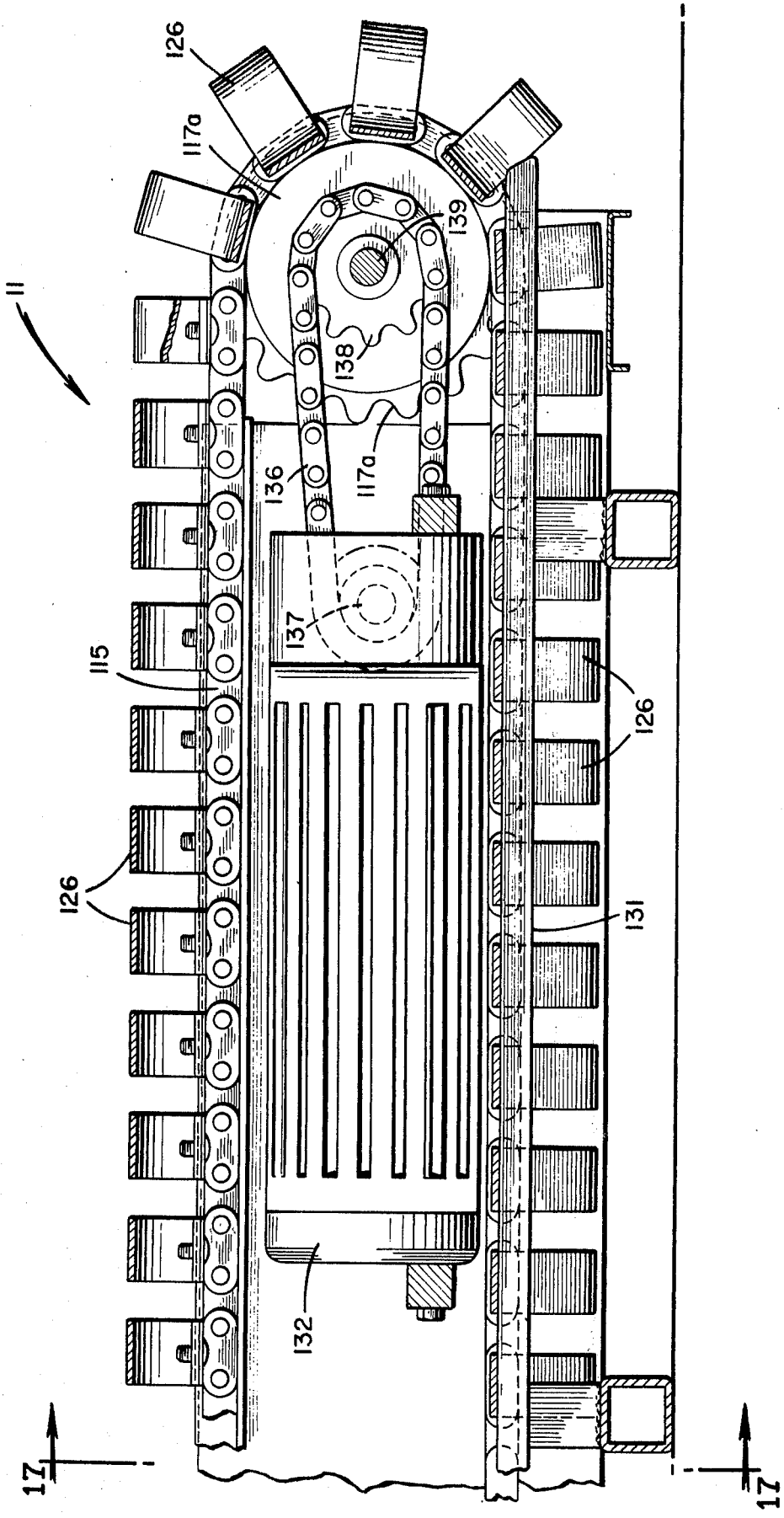
FIG. 16 is a fragmentary front elevation of the opposite end of the conveyor of FIG. 15.

In this embodiment of the invention wherein aa bag is loaded with tree bark or other material, closed and conveyed to storage, or to a vehicle for shipping in an uninterrupted sequence of steps as illustrated diagrammatically in FIG. 1, a conveyor 11 is disposed below funnel 32 as shown in FIGS. 2 and 3. Bag 16 after loading is dropped by the bag holder of funnel 32 to conveyor 11. That end of coneyor 11 immediately below the bagging apparatus is illustrated in front elevation in FIG. 15 while the opposite end is illustrated in front elevation in FIG. 16.

Figure 17:
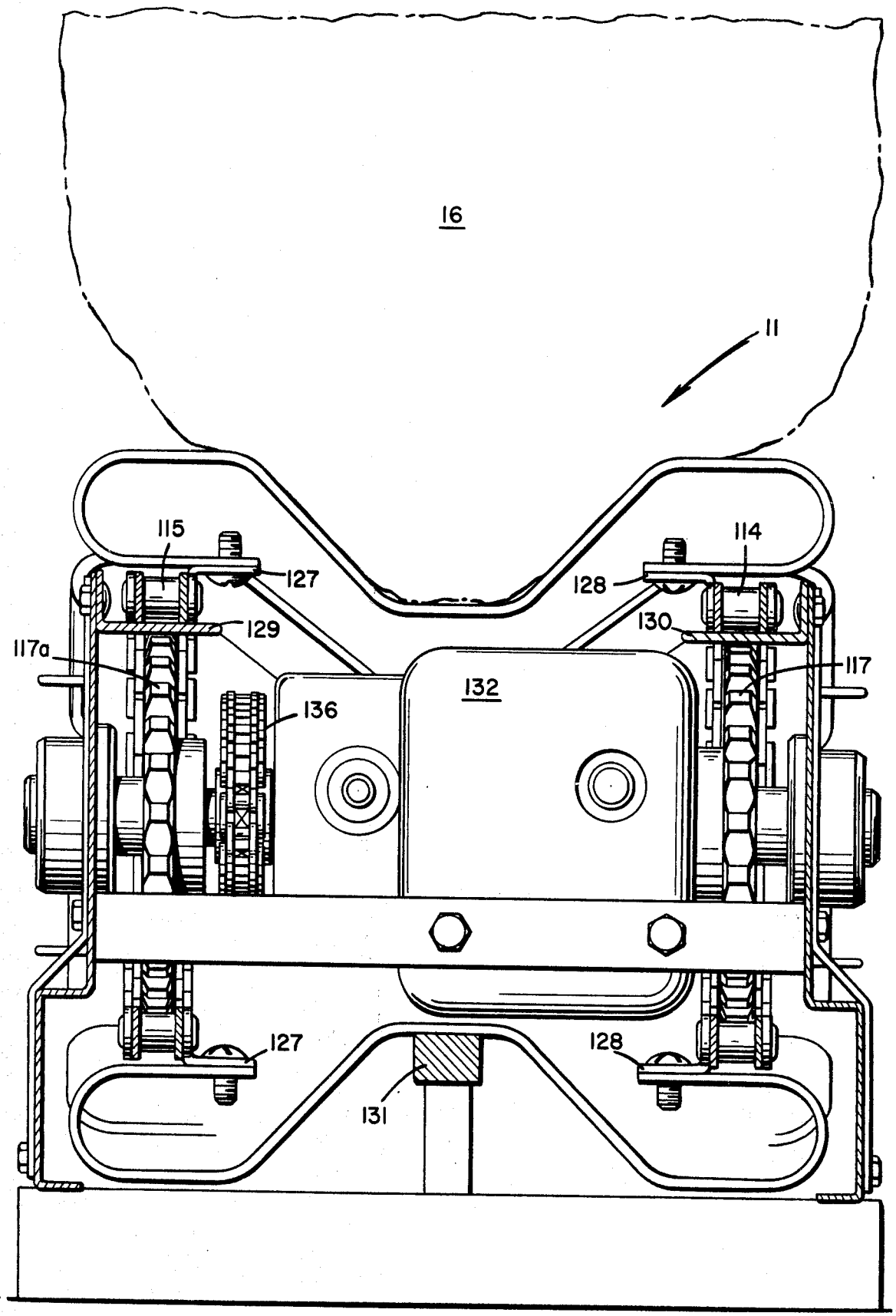
FIG. 17 is an end view of the conveyor looking from left to right as the conveyor is disposed in FIG. 15.

An enlarged cross-section of conveyor 11 is shown in FIG. 17. Conveyor 11 has laterally spaced sprocket chains 114 and 115 looped about longitudinally spaced sprocket wheels 116 and 117 and 116a and 117a. A longitudinally extending roller 118 is supported on vertical bars 119 and 120 alongside conveyor 11 in a position just above the upper reach of conveyor 11 immediately below funnel 32 to guide bag 16 to the conveyor 11 when it falls from the bag holder. A lattice type framework having upright members 121 and 122 and horizontal members 123 and 124 is disposed alongside the conveyor 11 adjacent to the operator who places the bags on the bag holder to support the bags 16 as they are carried by conveyor 11 away from the bag loading equipment. A similar lattice-like guide rail structure 125 is provided on the opposite side of conveyor 11 as shown in FIG. 2. The leading ends of members 123 and 124 and the corresponding members of guide frame 125 may be bent outwardly as illustrated in FIG. 2 to assist in placing the bags in an upright position and in directing the bags towards a closing device such as a heat sealing unit 12.

Referring now to FIG. 17, longitudinally spaced ribs 126 are bolted to brackets 127 and 128 which are fastened by sprocket pins to links in sprocket chains 114 and 115, respectively. These ribs 126 are bent to form a generally U-shaped depression in which the bottom of a bag will sit and are bent into a loop at each end. The bottom part of the loop is bolted to the bracket 127 or 128. L-shaped members 129 and 130 extend substantially along the length of the underside of the upper reaches of sprocket chains 114 and 115 and support them against sagging. Support members 129 and 130 are bolted to upright members attached to the frame of the conveyor. A bar 131 is disposed below the lower reach of conveyor 11 (FIG. 17) to support ribs 126 from sagging and riding on the floor. Bar 131 extends substantially throughout the length of conveyor 11 and may be supported at spaced points along its length. A motor 132 (FIG. 16) drives conveyor 11 through sprocket chain 136 and sprocket wheels 137 and 138 fixed on shaft 139 for rotation therewith. Sprocket wheels 116 and 116a (not shown) are also fixed on shaft 139 for rotation therewith. Sprocket wheels 116a and 117a drive chain 115.

A heat sealing apparatus 12 may be disposed above conveyor 11 where the walls of the bag 16 about its open end will pass between rotating heated bands and become welded or fused together. Any conventional heat sealer having a pair of longitudinally extending irons spaced laterally from each other to have a gap therebetween to accommodate the bag and disposed above conveyor 11 where the bag will pass throught the gap may be used. At least one of the bands should be heated to the fusing point of the plastic bag. The heat seal may be cooled by passing the sealed bag through a gap between water cooled members or the like.

Figure 18:
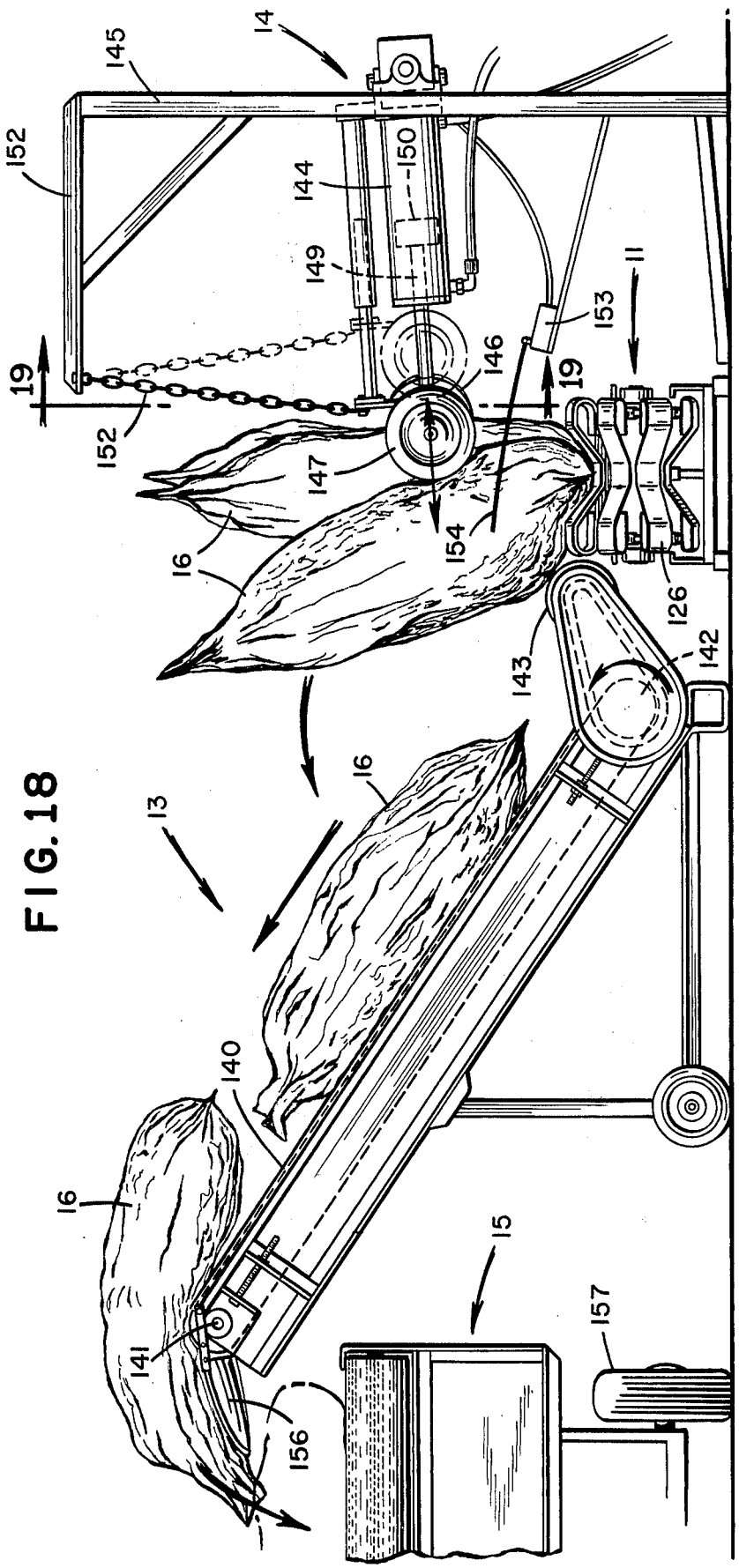
FIG. 18 is an end view of the conveyor of FIG. 17 associated with a device, shown in side elevation, for transferring a closed bag to a second conveyor which elevates the bags.
Figure 20:
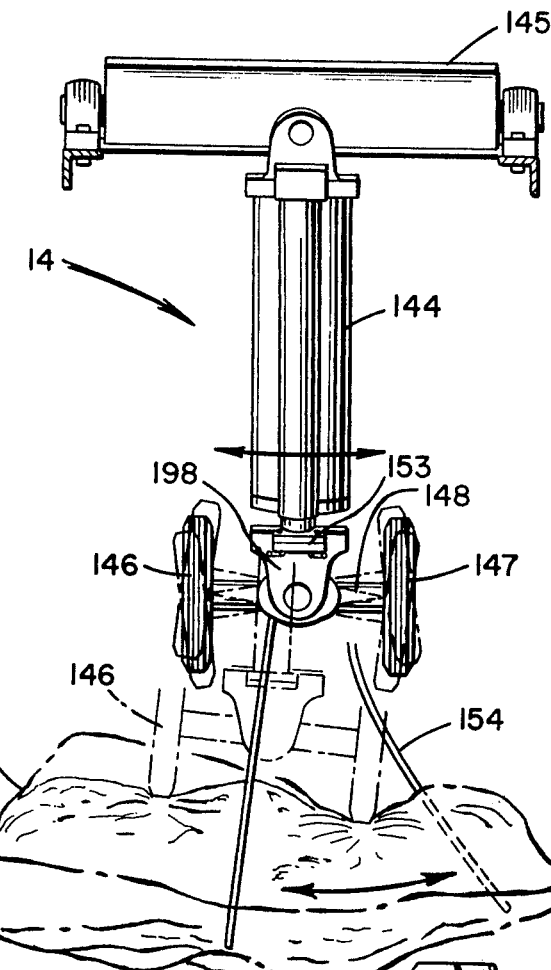
FIG. 20 is an enlarged plan view taken along the line 20—20 of FIG. 19.
Figure 19:
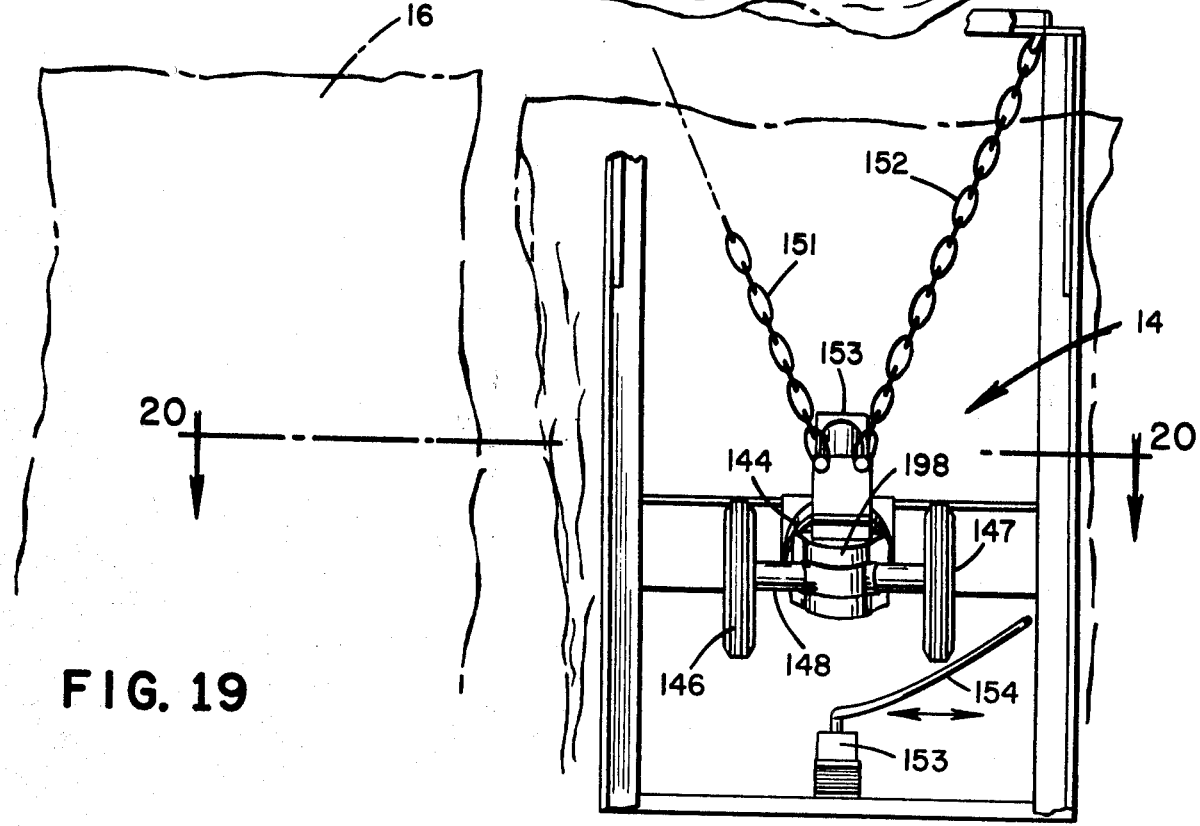
FIG. 19 is an enlarged front elevation of the bag removal device illustrated in FIG. 18.

In the preferred embodiment of the apparatus a means is provided for transferring the bag from conveyor 11 to a second endless belt 13 having its longitudinal axis in a plane which is substantially perpendicular to that of conveyor 11. An embodiment of a bumping device 14 suitable for transferring a bag from conveyor 11 to conveyor 13 is illustrated in FIGS. 18 through 20. As shown in FIG. 18, bags 16 stand upright on conveyor 11 and have been closed as they approach bumper 14. An inclined endless belt 140 is looped about rollers 141 and 142. A roller 143 is disposed above the end of endless belt 140 adjacent to bumper 14. Roller 143 is immediately adjacent conveyor 11 and carries the bottom portion of a bag 16 falling from conveyor 11 to the surface of belt 140.

The bumping mechanism 14 provided by the invention has a pneumatic cylinder 144 supported in a substantially horizontal position by a pair of chains 151 and 152 and a frame 145 above conveyor 11.

A pair of wheels 146 and 147 are mounted on axle 148 which is disposed through an opening in a bearing block 198 unsupported on frame 145. One end of a piston rod 149 carried by piston 150 disssposed in cylinder 144 is connected to frame 145. A source of air under pressure is provided with a suitable valve for directing air alternately to one side of the piston 150 to withdraw piston rod 149 into cylinder 144 and to the other side of the piston to extend piston rod 149. Chains 151 and 152 are attached to an overhead crossmember 152 of frame 145 and to a plate 153 secured to the axle 148. Chains 151 and 152 support wheels 146 and 147 and cylinder 144 in a position where wheels 146 and 147 will push bag 16 over so it will fall from conveyor 11 when the bag is aligned with conveyor 13. The cylinder 144 and wheels 146 and 147 are suspended on chains 151 and 152 pivoting and vertical adjustment of the wheels to accommodate the dimensions and shape of a bag is permitted. A switch 153 is actuated by a flexible feeler rod 154 when the latter is moved by a bag 16 to open the valve to direct fluid pressure into cylinder 144 and to extend piston rod 149 and push wheels 146 and 147 against bag 16 until it falls from conveyor 11 when the bag is aligned with conveyor 13. As soon as bag 16 falls from contact with feeler rod 154 it moves back to its normal position and switch 153 changes the valve to direct air into cylinder 144 to withdraw piston rod 149. Axle 148 passes through a bore in support block 198 and is supported loosely therein so there is sufficient play for axle 148 to move up and down therein as illustrated in FIG. 19. This permits wheels 146 and 147 to move to an angle where they will push evenly on bag 16.

A conventional endless belt conveyor 15 having its longitudinal axis disposed at right angles to the longitudinal axis of conveyor 13 may be positioned below the discharge end of conveyor 13 so the bags will fall to the surface of conveyor 15. A concave guide member 156 may be provided for guiding the bag from the elevated end of endless belt 13 so that the bag will be turned to fall on conveyor 13 with its longitudinal axis in a plane substantially parallel to the longitudinal axis of endless belt 15. Endless belt conveyor 15 may be mounted on wheels 157 so it can be moved with respect to belt 13. In this way, the discharge end of belt 15 may be moved from each stack of bags resulting from the discharge thereof at the end of belt 15.

Figure 22:
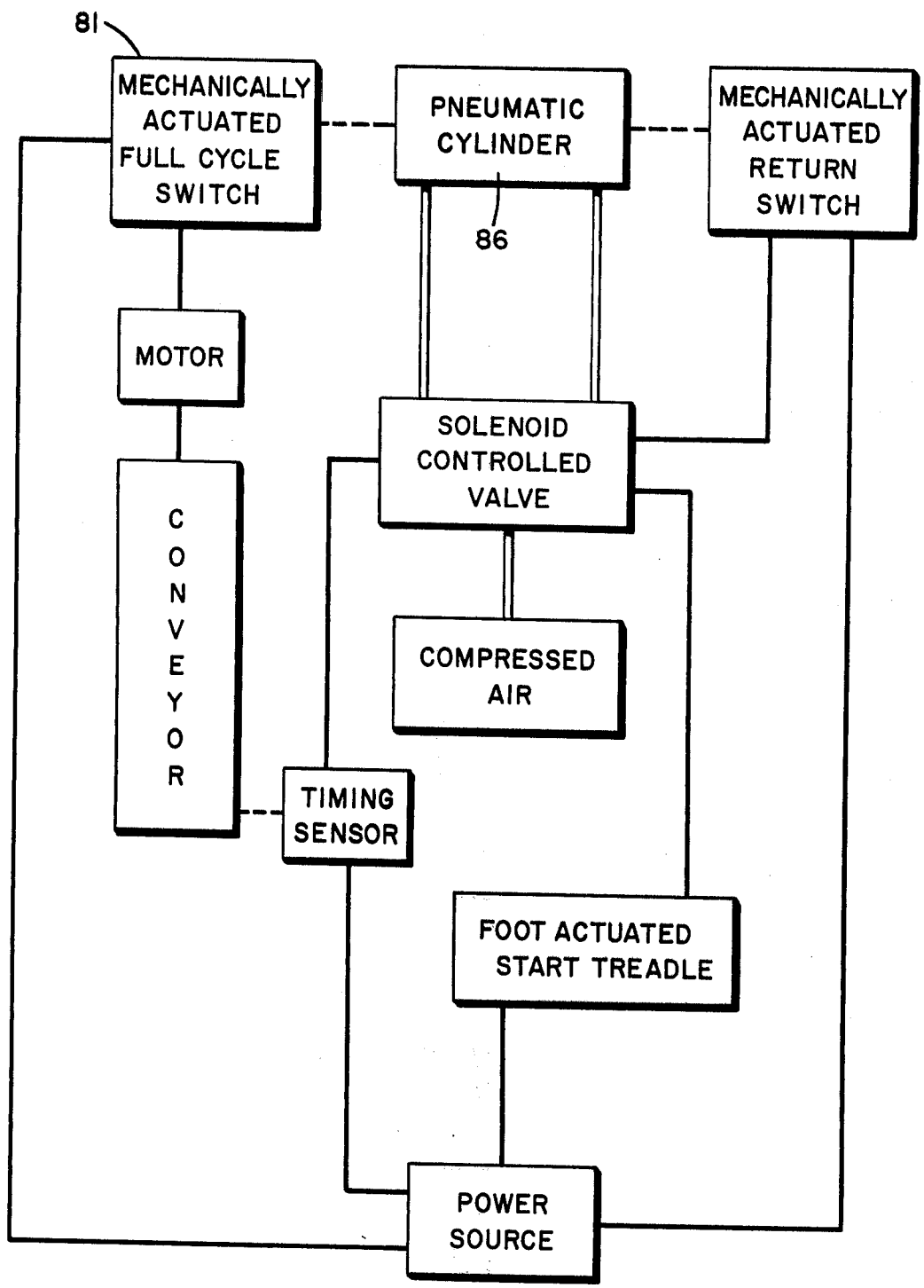
FIG. 22 is a diagram of the control and actuating system of the bag loading apparatus illustrated in FIGS. 2 through 14.

The operation of the bagging unit 10 has already been explained. This operation is illustrated diagrammatically in FIG. 22. The operator, after he has placed a bag on the bag holder, depresses the foot treadle connected to a suitable power source. The foot treadle actuates the solenoid controlled valve which directs compressed air under pressure into pneumatic cylinder 85a to actuate the mechanism including lever 74 and plate 65 to secure the bag on the bag holder. Switch 81 at this point is mechanically actuated and signals motor 53 to rotate conveyor 27. Disc 95 and limit switch 101 act as a sensor which signals the solenoid to reverse the control valve to extend piston rod 85 and close switch 81 thereby stopping the rotation of conveyor 27 and the flow of bark through funnel 32.

Although the invention has been described in detail for the purpose of illustration it is to be understood that such detail is solely for that purpose and that those skilled in the art can make variations therein without departing from the spirit and scope of the invention except as it may be limited by the claims.

I claim:

1. An apparatus for dispensing measured volumes of flowable solid material comprising a housing having a bottom and end walls and enclosing a space for storing said material, means for discharge of material through the bottom comprising an endless belt disposed in said space over the said bottom and having a width substantially equal to the width of the space and extending longitudinally across the space from one end wall to a point spaced from an opposite end wall to provide space for flow of material over the end of the endless belt, an opening in said bottom for discharge of material flowing over the end of the endless belt, means for agitating material in the space and for limiting the thickness of material carried by said endless belt where the material flows therefrom, means for driving said belt with its upper reach travelling towards said discharge opening, means for initiating said driving means, and means for stopping the movement of the endless belt after it has travelled a predetermined distance.

2. The apparatus of claim 1 wherein said belt is looped about longitudinally spaced rollers, said means for driving the belt is a motor operatively associated with one of said rollers and said means for stopping movement of the belt comprises a first disc fixed to rotate with one of said rollers, a second disc disposed in a plane substantially perpendicular to the face of the first disc and having a peripheral edge which frictionally engages said face, means for fixing the position of said edge on the said face to thereby determine the relative amount of rotation of the first disc for each revolution of the second disc, said second disc being rotated in response to rotation of the first disc, and means carried by the second disc for stopping movement of the belt by said motor.

3. The apparatus of claim 2 wherein said means for stopping movement of the belt comprises a cam surface on said second disc and a cam follower which actuates an electrical switch to stop the motor.

4. The apparatus of claim 3 wherein said second disc is secured to a plate having a hole therethrough, a threaded shaft is disposed through said hole, and means are threadably mounted on said shaft on opposite sides of said plate for moving said plate on the shaft and thereby position the edge of the second disc on the face of the first disc and thereby determine the relative amount of rotation of the two discs.

5. The apparatus of claim 1 wherein the said sidewalls of the housing are substantially perpendicular to the upper surface of the endless belt and a shield is disposed above the said surface of the belt to retard flow of material to between the belt edge and sidewall.

6. Apparatus for measuring a volume of flowable solid material comprising an endless belt looped about spaced rollers and disposed to be covered with said material, means for rotating the endless belt on the rollers and discharging material over one end thereof from the apparatus, means for initiating said rotation and means for stopping the rotation comprising a first disc fixed for rotation with one of the rollers, a second disc supported normal to the face of the first disc with its peripheral edge frictionally engaging the face of the first disc, a cam on the second disc, a cam follower, means for stopping the said rotating means responsive to the cam follower, and means for determining the thickness of the material on the belt adjacent to the discharge end thereof.

7. A conveyor system comprising a first endless conveyor and a second endless conveyor disposed at an angle thereto, and means for transferring cargo carried by the first conveyor to the second conveyor comprising a cylinder, a piston slidably disposed in the cylinder, a piston rod attached to the piston and extending out of the cylinder, means for moving the piston in the cylinder with fluid pressure to alternately extend and withdraw the piston rod, a pair of laterally spaced wheels, means for loosely supporting the wheels on the end of the piston rod whereby they are free to pivot and move vertically to accommodate the contour of the cargo, said piston rod being disposed above the first conveyor at a point whereby the wheels push cargo from the first conveyor to the second conveyor when the piston rod is extended and are removed from the path of travel of the cargo when the piston rod is withdrawn in the cylinder, and means for actuating the piston moving means comprising a flexible rod in the path of the cargo.

8. The apparatus of claim 7 wherein said first conveyor comprises laterally spaced sprocket chains looped about longitudinally spaced pairs of sprocket wheels and spaced substantially U-shaped bars secured to links in the sprocket chain adapted to support a bag of material in an upright position.

9. An apparatus for packaging a flowable solid material which comprises a means for dispensing a measured volume of said material into a bag comprising a housing having a bottom wall and sidewalls which enclose a space adapted to contain said material, an opening in said bottom wall for discharge of material from the space, an endless belt across said bottom wall in said space and looped about a pair of rollers with one of said rollers above the said opening whereby material falling over that end of the loop of the belt will fall from the space enclosed by the housing, means for driving the endless belt with its upper reach travelling towards said opening, means for supporting a bag below said opening comprising a funnel removably secured to the said housing about the opening and having aa discharge opening, a bag holder attached to the funnel about its discharge opening, said bag holder having a substantially elliptically shaped housing formed by a pair of telescoping vertical walls, means for moving one of said pair of walls to and fro horizontally with respect to the other and thereby vary the dimension of said elliptically shaped housing along its major axis from smaller than the dimension of said open end of the bag to larger than said open end, and means for actuating said driving means responsive to movement of the said wall of the bag holder housing.

10. The apparatus of claim 9 wherein said means for actuating the driving means comprises an electrical contact point electrically connected to the drive means for supplying power thereto, a first lever adapted to move into and from contact with said contact point, means for urging the first lever into contact with said contact point and break the electrical power supply to the drive means, a second lever pivotally associated with the first lever and pivotally associated with said movable wall of the bag holder housing whereby movement of the bag holder housing to a width larger than the width of an open end of a bag occurs without movement of the first lever by the second lever but upon restriction of the movement of the bag holder housing wall to the width of a bag continued movement of the second lever biases said first lever from the contact point and closes the electrical power supply, a pneumatic cylinder, a piston slidably disposed in the cylinder responsive to fluid under pressure and having a piston rod attached to the second lever for moving the lever and bag holder housing horizontally to vary the dimensions of the bag holder, and a second contact point disposed adjacent to the second lever where it will be struck by the second lever only after the bag holder housing dimension exceeds the dimension of the open end of a bag, and means for reversing movement of the piston responsive to contact of the second contact by the second lever.

11. The apparatus of claim 10 wherein said bag holder is disposed above an endless conveyor comprising laterally spaced sprocket chains looped about longitudinally spaced rollers, longitudinally spaced support members bent to conform substantially to the shape of a bottom of a filled bag and attached to said sprocket chains whereby said endless conveyor is adapted to support a bag containing said solid material with its open end up.

12. The apparatus of claim 11 wherein said conveyor is associated with means for closing said open end of a bag while it is supported by the conveyor.

13. The apparatus of claim 12 wherein the means for closing the bag is a means for heat sealing a plastic bag.

14. The apparatus of claim 12 wherein the said conveyor is a first endless conveyor disposed where a bag falling from the bag holder will fall bottom first thereon and be supported open end up and a second endless conveyor is disposed substantially perpendicularly to the first conveyor at a point downstream from the bag closing means, and means for transferring cargo carried by the first conveyor to the second conveyor comprising a cylinder, a piston slidably disposed in the cylinder, a piston rod attached to the piston and extending out of the cylinder, means for moving the piston in the cylinder with fluid pressure to alternately extend and withdraw the piston rod, a pair of laterally spaced wheels pivotally supported on the end of the piston rod above the conveyor at a point whereby the wheels push cargo from the conveyor when the piston rod is extended and are removed from the path of travel of the cargo when the piston rod is withdrawn in the cylinder, and means for actuating the piston moving means comprising a flexible rod in the path of the cargo.

15. The apparatus of claim 14 wherein the loop of said second conveyor belt has one end disposed at a level substantially the same as the first endless conveyor belt and a second elevated end, and a third endless conveyor belt is disposed below the second conveyor belt.

16. The apparatus of claim 15 wherein a concave guide means is associated with the elevated end of said second conveyor belt to guide the bag to the third conveyor belt.

17. The apparatus of claim 16 wherein the third conveyor has its longitudinal axis substantially parallel to the longitudinal axis of the first conveyor.

18. An apparatus for controlling movement of an endless belt around longitudinally spaced rollers, one of said rollers being fixed to a shaft which is operatively connected to a drive means, said apparatus comprising a means for actuating the drive means and means for stopping the drive means responsive to rotation of said roller connected to the drive means comprising a first disc fixed to the shaft for rotation therewith, a second disc having a peripheral edge, means for supporting said second disc with its said edge frictionally engaging the first disc for rotation therewith, means for moving said supporting means to change the radial position of said edge on said first disc, a caam surface disposed on the second disc in spaced relationship with said edge, a limit switch in an electrical circuit supplying power to the drive means for cutting off the power, a lever for actuation of the limit switch, and a cam follower fixed to the lever and disposed to follow the cam surface as the second disc rotates.

19. A bag filling and supporting device comprising a discharge spout having open top and bottom ends, means for attaching the spout at its open top to a hopper, and means for supporting a bag by its open end attached to the bottom end of the spout, said bag supporting means comprising a first panel member surrounding the bottom end of the spout and having an opening aligned with the opening in the bottom of the spout, said first panel having a track along each of two opposite sides of the opening therein, a second panel member having a rail slidably disposed in each of the tracks, said second panel having an opening which combines with the opening in the first panel to form an opening approximating the configuration of the open end of the spout which is varied in dimensions along its longitudinal axis as the second panel slides in the tracks of the first panel, a first flange depending from the first panel and around only three sides of the opening in the first panel, a second flange depending from the second panel and about only three sides of the opening therein, said flanges overlapping at their open ends and combining to provide a wall member adapted to be inserted into an open end of a bag, and means for sliding the second panel relative to the first for alternately elongating said wall member in an open end of a bag until the bag is held firmly thereby and for shortening the wall member to release a bag held thereby.

20. The device of claim 19 wherein the opening in the depending flange on each panel has a configuration of one-half of an octagon and the flanges overlap to form an octagonal-shaped opening.

21. A cargo transfer conveyor system comprising a first conveyor and a second conveyor disposed with one end adjacent to the side of the first conveyor, and means for transferring cargo from the first to the second conveyor comprising a frame, a pneumatic assembly comprising a cylinder, a piston and piston rod supported by the frame and positioned where the piston rod will move across the width of the first conveyor when it is extended, a pair of spaced wheels, means for loosely supporting the wheels on the exposed end of the piston rod to permit pivoting about the axis of the piston rod and vertical movement of the wheels to adjust to the contour of cargo on the first conveyor as the wheels are moved against the cargo, and a sensor means disposed over the first conveyor where it will be struck by cargo disposed in front of the transfer means and actuate the pneumatic assembly.

22. The cargo transfer conveyor system of claim 21 wherein the means for supporting the wheels on the piston rod comprises an axle for the wheels disposed in a bore through the piston rod of larger diameter than the diameter of the axle and flexible means suspending the wheel axle assembly from the frame.

23. A cargo transfer conveyor system comprising a first conveyor, a second conveyor and a third conveyor disposed with a firsts end adjacent to the side of the first conveyor and an opposite end adjacent to the second conveyor, a penumatic assembly comprising a cylinder, a piston and piston rod, means for supporting the pneumatic assembly where the piston rod will move across the width of the first conveyor to a point near the first end of the third conveyor when the piston rod is extended, a pair of spaced wheels, means for loosely supporting the wheels on the piston rod to permit pivoting about a vertical axis and vertical movement of the wheels to adjust to the contour of cargo on the first conveyor in front of the pneumatic assembly as the wheels are moved against the cargo, sensor means disposed over the first conveyor where it will will be struck by cargo disposed in front of the transfer means and actuate the pneumatic assembly, and means for supporting the bottom portion of the cargo as it is pushed from the first conveyor to the third conveyor comprising a roller disposed alongside the surface of the first conveyor and above the first end of the third conveyor.

24. The article transfer system of claim 23 wherein the said opposite end of the third conveyor is elevated above the first end thereof and the second conveyor is disposed below the said opposite end of the third conveyor.

* * * * *